(12) United States Patent
Takahashi et al.

(10) Patent No.: US 8,269,752 B2
(45) Date of Patent: Sep. 18, 2012

(54) TOUCH PANEL DEVICE AND CONTACT POSITION DETECTION METHOD

(75) Inventors: Yuji Takahashi, Kawasaki (JP); Fumihiko Nakazawa, Kawasaki (JP); Satoshi Sano, Kawasaki (JP); Takashi Katsuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 321 days.

(21) Appl. No.: 12/634,174

(22) Filed: Dec. 9, 2009

(65) Prior Publication Data

US 2010/0085332 A1 Apr. 8, 2010

Related U.S. Application Data

(62) Division of application No. 10/696,037, filed on Oct. 30, 2003, now Pat. No. 7,667,694.

(30) Foreign Application Priority Data

Nov. 1, 2002 (JP) ................................. 2002-320423

(51) Int. Cl.
*G09G 5/00* (2006.01)
(52) U.S. Cl. .................... 345/177; 345/173; 345/174
(58) Field of Classification Search ........... 345/173–177
See application file for complete search history.

(56) References Cited

U.S. PATENT DOCUMENTS

| | | | |
|---|---|---|---|
| 6,504,530 B1 | 1/2003 | Wilson et al. | |
| 6,630,929 B1 | 10/2003 | Adler et al. | |
| 6,750,853 B2 * | 6/2004 | Takahashi et al. | 345/177 |
| 6,885,491 B2 | 4/2005 | Ross-Messemer et al. | |
| 7,157,649 B2 * | 1/2007 | Hill | 178/18.04 |
| 2002/0050983 A1 | 5/2002 | Liu et al. | |
| 2002/0135570 A1 * | 9/2002 | Iisaka et al. | 345/177 |
| 2003/0206162 A1 * | 11/2003 | Roberts | 345/173 |
| 2004/0160421 A1 | 8/2004 | Sullivan | |

FOREIGN PATENT DOCUMENTS

JP 07-319613 A 12/1995

* cited by examiner

*Primary Examiner* — Quan-Zhen Wang
*Assistant Examiner* — Jennifer Nguyen
(74) *Attorney, Agent, or Firm* — Westerman, Hattori, Daniels & Adrian, LLP

(57) ABSTRACT

A burst wave is applied to an excitation element of a touch panel main body from an oscillation section so as to excite surface acoustic waves, and the excited surface acoustic waves are received by a receiving element of the touch panel main body. The received signals are A/D converted by a receiving section, and a control section calculates the contact position and the contact width of the object in contact with the touch panel main body, based on time-series changes in the received strength. Based on the received strength of surface acoustic waves, the control section controls the wave number of the burst wave to be applied to the excitation element.

7 Claims, 19 Drawing Sheets

TOUCH PANEL DEVICE AND CONTACT POSITION DETECTION METHOD

CROSS-REFERENCE TO RELATED APPLICATION

This application is a divisional application of Ser. No. 10/696,037, filed Oct. 30, 2003, which is based upon and claims the benefit of priority from the prior Japanese Patent Application No. 2002-320423, filed Nov. 1, 2002, the entire contents of which are hereby incorporated by reference.

BACKGROUND OF THE INVENTION

The present invention relates to a touch panel device for detecting the contact of an object, such as a finger or a pen, with the touch panel device, and more particularly relates to a touch panel device and a contact position detection method, for detecting the contact position of the object by detecting attenuation and cutoff of surface acoustic waves (SAWs).

With the spread of computer systems, mainly personal computers, there has been used a device for inputting new information or giving various instructions to a computer system by pointing at a position on the display screen of a display device on which information is displayed by the computer system, with a finger or a pen. In order to perform an input operation with respect to the information displayed on the display screen of the display device of a personal computer or the like by a touching method, it is necessary to detect the contact position (pointed position) on the display screen with high accuracy.

Well known examples of a touch panel device for detecting the contact position of an object such as a finger or a pen are a device using a resistance film, and a device using ultrasonic waves. The former device using a resistance film detects a change in the resistance of the resistance film caused by contact of the object with the resistance film. This device has the advantage of low consumption of power, but has problems in the aspects of the response time, detection performance and durability.

By contrast, in the device using ultrasonic waves, the contact position of an object such as a finger or a pen is detected by propagating surface acoustic waves on a non-piezoelectric substrate, for example, and detecting attenuation of the surface acoustic waves caused by contact of the object with the non-piezoelectric substrate. In general, this touch panel device has a structure in which a burst wave is applied to cause a transducer to generate surface acoustic waves, the generated surface acoustic waves are propagated on the non-piezoelectric substrate, the propagated surface acoustic waves are received, and the contact position of the object is obtained based on the received results. A variety of such touch panel devices have been proposed (for example, Japanese Patent Application Laid-Open No. 7-319613/1995).

The present inventor et al. is conducting research and development on a touch panel device that uses, as a transducer, an IDT (inter digital transducer: comb-like electrode) that can be produced collectively using a photolithography technique. In this touch panel device, an element composed of an IDT and a piezoelectric thin film is used as each of excitation elements for exciting surface acoustic waves and receiving elements for receiving propagated surface acoustic waves.

FIG. 1 is an illustration showing the configuration of such a touch panel device using IDTs. In FIG. 1, the numeral 61 represents a rectangular non-piezoelectric substrate. A plurality of excitation elements 62, each composed of an input IDT and a piezoelectric thin film, for exciting surface acoustic waves are arranged in a line on one end of each of the X-direction and the Y-direction of the non-piezoelectric substrate 61 so that the excitation elements 62 correspond to a plurality of tracks, respectively. Moreover, a plurality of receiving elements 63, each composed of an output IDT and a piezoelectric thin film, for receiving surface acoustic waves are arranged in a line on the other end of each of the X-direction and the Y-direction of the non-piezoelectric substrate 61 so that the receiving elements 63 face the excitation elements 62.

In this touch panel device, a burst wave is applied to each of the excitation elements 62 to excite surface acoustic waves and propagate them on the non-piezoelectric substrate 61, and then the propagated surface acoustic waves are received by the receiving elements 63. When an object such as a finger or a pen is in contact with the propagation path of a surface acoustic wave on the non-piezoelectric substrate 61, the surface acoustic wave attenuates. Accordingly, by detecting whether or not the level of the received signals at the receiving elements 63 is attenuated, it is possible to detect the presence or absence of contact of the object and the contact position.

In addition, the present inventor et al. proposed a touch panel device in which the excitation elements and the receiving elements are arranged so as to propagate surface acoustic waves in oblique directions (diagonal directions) of the substrate. FIG. 2 is an illustration showing an example of the electrode structure of such a touch panel device. In FIG. 2, the numeral 70 represents a rectangular non-piezoelectric substrate made of glass material, and a center portion enclosed by the broken line is a detection region 70a capable of detecting the contact position.

In a frame region outside the detection region 70a, which is a peripheral section of the non-piezoelectric substrate 70, four IDTs 71 are disposed. Each IDT 71 comprises facing bus electrodes 72, and comb-like electrode fingers 73 which are extended from the bus electrodes 72 by turns and bent in the middle. In this structure, lines of comb-like electrode fingers 73 tilted in two directions from the facing direction of the bus electrodes 72 are formed, thereby realizing excitation of surface acoustic waves in two directions and reception of surface acoustic waves from two directions. In this example, the IDTs 71 on the upper side and the lower side function as excitation elements for simultaneously exciting surface acoustic waves in two different directions, while the IDTs 71 on the left side and the right side function as receiving elements for simultaneously receiving surface acoustic waves from two different directions.

In the touch panel device having the structure shown in FIG. 1 or FIG. 2, two pairs or four pairs of electrode groups are used, and the contact position and/or the contact width of the object are calculated from time-series changes in the received strength of surface acoustic waves (the time domain waveform). The S/N of the received signal is proportional to the number of pairs of electrodes included in the aperture of the receiving element that receives the surface acoustic wave. Therefore, since the number of times of driving of the surface acoustic wave (the wave number of the burst wave applied) for maximizing the strength of surface acoustic waves to be received is determined by the electrode structure, a fixed number of burst wave, which is determined by a design value or determined at the time of activation, is applied to the excitation elements. Besides, a fixed threshold value determined at the time of design or activation is used when calculating the contact position and the contact width.

However, since there is a difference in the performance between the respective electrode pairs, even when the burst wave of the same wave number is applied to propagate the surface acoustic waves, there is a variation in the received strength of the time domain waveform. Thus, when calculating the contact position and the contact width using the fixed threshold value determined at the time of design or activation, differences occur in touch sensitivity on the panel. Moreover, when the panel is dirty with finger prints, etc., the received strength of the time domain waveform varies. As a result, when the panel gets more dirty, the touch sensitivity gradually decreases, and there arises the problem that high pressure of object (tool force when a pen is used) is necessary to calculate the contact position and the contact width. Further, although at least two channels of receiving signals are necessary to calculate the contact position and the contact width, there is the case where the necessary pressure of the object for calculation differs between the respective channels, and only one channel is valid. In such a case, there is the problem that the contact position and contact width of the object cannot be correctly calculated. Therefore, the present inventor el al. continues to conduct further research and development to solve these problems.

BRIEF SUMMARY OF THE INVENTION

It is an object of the present invention to provide a touch panel device and a contact position detection method capable of always achieving stable touch sensitivity, even when there is a change in strength of the time domain waveform because of finger prints, etc., by controlling the wave number of a burst wave, according to the received strength of surface acoustic waves.

Another object of the present invention is to provide a touch panel device and a contact position detection method, capable of accurately detecting the contact position of an object, without requiring high pressure of the object even when the panel is dirty, by controlling the wave number of a burst wave, according to the received strength of surface acoustic waves.

Still another object of the present invention is to provide a touch panel device capable of eliminating the influence of noise and improving the detection accuracy of the contact position by smoothing the obtained time domain waveform.

Yet another object of the present invention is to provide a touch panel device capable of detecting the contact position without being influenced by a constant change in the time domain waveform caused by dirt or the like on the panel by updating the waveform as a comparison base which is stored for use in calculating the contact position.

A further object of the present invention is to provide a touch panel device capable of correcting the deviation of the contact position due to the wave number of the burst wave and improving the detection accuracy by detecting the contact position and/or the contact width of an object, based on the attenuation start position and attenuation end position and the wave number of the burst wave, or based on the attenuation start position and maximum attenuation position and the wave number of the burst wave.

A further object of the present invention is to provide a touch panel device capable of identifying a correct contact position by selecting a contact position with a larger contact width when a plurality of contact positions are detected.

A further object of the present invention is to provide a touch panel device capable of achieving uniform detection sensitivity on the panel by correcting the strength of the time domain waveform, according to the propagation distance.

A further object of the present invention is to provide a touch panel device capable of eliminating an erroneously detected contact position by measuring the distance between contact positions detected every fixed time interval and invalidating the contact position when the distance is longer than a predetermined value.

A touch panel device according to a first aspect of the present invention is a touch panel device having at least one pair of exciting means for exciting surface acoustic waves by application of a burst wave and receiving means for receiving surface acoustic waves, which are arranged to face each other on a substrate capable of propagating surface acoustic waves, for propagating surface acoustic waves between the exciting means and the receiving means on the substrate and detecting a position of an object in contact with the substrate, based on received results by the receiving means, and comprises: measuring means for measuring strength of surface acoustic waves received by the receiving means; and control means for controlling the wave number of the burst wave to be applied to the exciting means, based on the strength of surface acoustic waves measured by the measuring means.

In the first aspect, the strength of surface acoustic waves received by the receiving means is measured, and the wave number of the burst wave to be applied to the exciting means is controlled based on the measured strength of surface acoustic waves. Specifically, when the strength of the received surface acoustic waves is lower than a predetermined value, the wave number of the burst wave is increased. Accordingly, even when the strength of surface acoustic waves to be received changes due to finger prints, etc., high touch sensitivity can be always obtained in a stable manner. As a result, even when the touch panel is dirty, the contact position of the object can be highly accurately detected without applying high pressure of the object (tool force).

According to a touch panel device of a second aspect of the present invention, in the first aspect, the measuring means measures the strength of surface acoustic waves with the passage of time, and the control means controls the wave number of the burst wave, based on a change in strength of the surface acoustic waves with the passage of time which is measured over a predetermined period by the measuring means.

In the second aspect, the strength of the received surface acoustic waves is measured with the passage of time, and the wave number of the burst wave is controlled based on a change in strength of the surface acoustic waves with the passage of time which is measured over a predetermined period. Accordingly, it is possible to achieve uniform touch sensitivity when the strength of the time domain waveform changes.

A touch panel device according to a third aspect of the present invention is a touch panel device having at least one pair of exciting means for exciting surface acoustic waves and receiving means for receiving surface acoustic waves, which are arranged to face each other on a substrate capable of propagating surface acoustic waves, for propagating surface acoustic waves between the exciting means and the receiving means on the substrate and detecting a position of an object in contact with the substrate, based on received signals by the receiving means, and comprises smoothing means for smoothing the received signals of surface acoustic waves received by the receiving means.

In the third aspect, in order to eliminate noise included in the received signals of surface acoustic waves received by the receiving means, a smoothing process is performed on the received signals by a moving-average method or other method. Consequently, the influence of noise is eliminated, and the detection accuracy of the contact position is improved.

A touch panel device according to a fourth aspect of the present invention is a touch panel device having at least one pair of exciting means for exciting surface acoustic waves by application of a burst wave and receiving means for receiving surface acoustic waves, which are arranged to face each other on a substrate capable of propagating surface acoustic waves, for propagating surface acoustic waves between the exciting means and the receiving means on the substrate and detecting presence or absence of an object in contact with the substrate, based on received results by the receiving means, and comprises: storing means for storing received results by the receiving means about surface acoustic waves propagated when no object is in contact with the substrate; and comparing means for comparing received results by the receiving means about surface acoustic waves propagated when an object is in contact with the substrate with the received results stored in the storing means.

In the fourth aspect, the received results of surface acoustic waves when no object is in contact with the substrate are stored, and the stored received results and received results of surface acoustic waves when an object is in contact with the substrate are compared, and the contact position is detected based on the comparison result. Thus, since a fixed threshold value which is determined during design or activation is not used as in a conventional art, even when the panel is dirty and has a low touch sensitivity, it is possible to correctly detect the contact position of the object.

According to a touch panel device of a fifth aspect of the present invention, in the fourth aspect, the touch panel device further comprises updating means for updating the received results stored in the storing means.

In the fifth aspect, the received results of surface acoustic waves which are received when no object is in contact with the substrate and are stored are periodically updated. Therefore, since the dirt on the penal is reflected in the received results as the comparison base, it is possible to correctly detect the contact position of the object without being influenced by constant change in the time domain waveform caused by the dirt on the panel.

According to a touch panel device of a sixth aspect of the present invention, in the fourth or fifth aspect, the touch panel device comprises: calculating means for calculating an attenuation start position and an attenuation end position of received surface acoustic waves, based on the comparison result obtained by the comparing means; and detecting means for detecting a contact position and/or a contact width of the object, based on the attenuation start position and attenuation end position calculated by the calculating means and the wave number of the burst wave applied to the exciting means.

In the sixth aspect, the attenuation start position and the attenuation end position of received surface acoustic waves are calculated, and the contact position and/or the contact width of the object are detected based on these attenuation start position and attenuation end position and the wave number of the burst wave applied to the exciting means. Accordingly, it is possible to correct the deviation of the contact position due to the wave number of the burst wave, and improve the detection accuracy of the contact position and/or the contact width.

According to a touch panel device of a seventh aspect of the present invention, in the fourth or fifth aspect, the touch panel device comprises: calculating means for calculating an attenuation start position and a maximum attenuation position of received surface acoustic waves, based on the comparison result obtained by the comparing means; and detecting means for detecting a contact position and/or a contact width of the object, based on the attenuation start position and maximum attenuation position calculated by the calculating means and the wave number of the burst wave applied to the exciting means.

In the seventh aspect, the attenuation start position and maximum attenuation position of received surface acoustic waves are calculated, and the contact position and/or the contact width of the object are detected based on these attenuation start position and maximum attenuation position and the wave number of the burst wave applied to the exciting means. Accordingly, it is possible to correct the deviation of the contact position due to the wave number of the burst wave, and improve the detection accuracy of the contact position and/or the contact width.

A touch panel device according to an eighth aspect of the present invention is a touch panel device having at least one pair of exciting means for exciting surface acoustic waves and receiving means for receiving surface acoustic waves, which are arranged to face each other on a substrate capable of propagating surface acoustic waves, for propagating surface acoustic waves between the exciting means and the receiving means on the substrate and detecting a position of an object in contact with the substrate, based on received results by the receiving means, and comprises: means for judging whether or not a plurality of contact positions are detected; calculating means for calculating a contact width of the object for each of the plurality of contact positions when the plurality of contact positions are detected; means for comparing a plurality of the calculated contact widths; and means for determining that the contact position with the largest contact width is the contact position of the object.

In the eighth aspect, when a plurality of contact positions are detected, since only one correct contact position is present, the contact width of the object is calculated for each of these plurality of contact positions, and the contact position with the largest contact width is determined to be the contact position of the object. It is thus possible to easily identify the correct contact position.

A touch panel device according to a ninth aspect of the present invention is a touch panel device having at least one pair of exciting means for exciting surface acoustic waves and receiving means for receiving surface acoustic waves, which are arranged to face each other on a substrate capable of propagating surface acoustic waves, for propagating surface acoustic waves between the exciting means and the receiving means on the substrate and detecting a position of an object in contact with the substrate, based on received results by the receiving means, and comprises correcting means for correcting strength of surface acoustic waves received by the receiving means, according to propagation distances of surface acoustic waves.

In the ninth aspect, the strength of received surface acoustic waves is corrected according to the propagation distances of surface acoustic waves. Since a surface acoustic wave that propagates in a long distance has larger attenuation compared to a surface acoustic wave that propagates in a short distance, the received strength of surface acoustic waves is corrected to compensate for the difference in the attenuation. Consequently, it is possible to achieve uniform touch sensitivity of the panel irrespective of the propagation distances.

A touch panel device according to a tenth aspect of the present invention is a touch panel device having at least one pair of exciting means for exciting surface acoustic waves and receiving means for receiving surface acoustic waves, which are arranged to face each other on a substrate capable of propagating surface acoustic waves, for propagating surface acoustic waves between the exciting means and the receiving means on the substrate and detecting a position of an object in contact with the substrate, based on received results by the receiving means, and comprises: memory means for storing contact positions of the object detected at predetermined time intervals; means for calculating a distance between a contact position detected just before and a contact position detected subsequently; and means for judging whether or not the calculated distance is larger than a predetermined value, wherein, if the calculated distance is larger than the predetermined value, the subsequently detected contact position is invalidated.

In the tenth aspect, in a plurality of contact positions detected in a time series, the distance between adjacent contact positions in time is calculated, and, if the calculated distance is longer than a predetermined value, the succeeding contact position is invalidated. Accordingly, it is possible to easily eliminate an erroneously detected contact position.

The above and further objects and features of the invention will more fully be apparent from the following detailed description with accompanying drawings.

DETAILED DESCRIPTION OF THE INVENTION

The following description will explain the present invention in detail with reference to the drawings illustrating an embodiment thereof.

Figure 3:
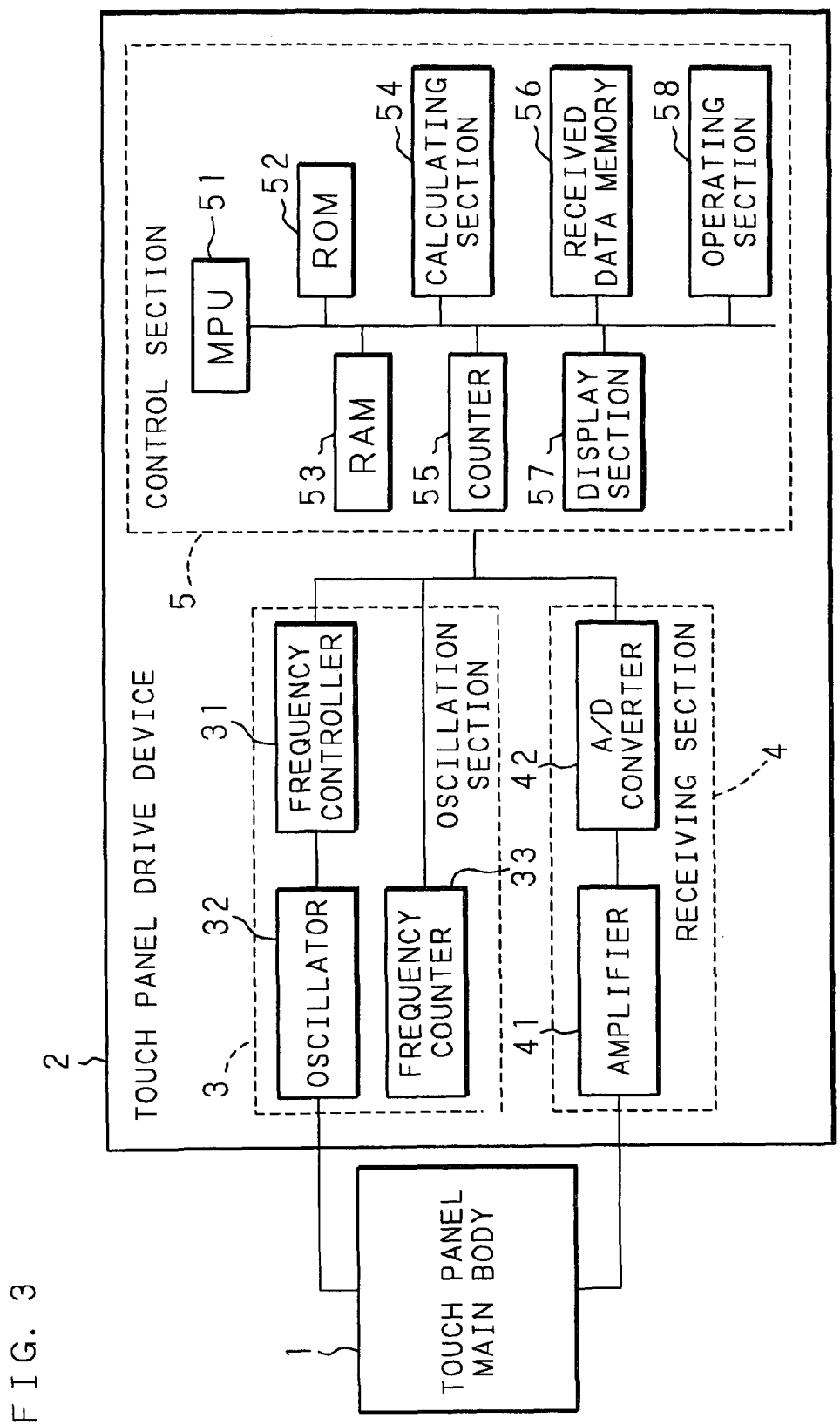
FIG. 3 is an illustration showing the basic configuration of a touch panel device according to the present invention.

FIG. 3 is an illustration showing the basic configuration of a touch panel device according to the present invention. The touch panel device of the present invention comprises: a touch panel main body 1 including excitation elements for exciting surface acoustic waves, a substrate for propagating surface acoustic waves, and receiving elements for receiving surface acoustic waves; and a touch panel drive device 2 for controlling the excitation/receiving of surface acoustic waves in the touch panel main body 1 and for calculating the contact position and contact width of an object in contact with the touch panel main body 1.

The touch panel drive device 2 is functionally divided into three sections, namely, an oscillation section 3 for controlling the excitation of surface acoustic waves, a receiving section 4 for controlling the receiving of surface acoustic waves, and a control section 5 for controlling the calculation of the contact position and contact width of the object and the operations of the oscillation section 3 and the receiving section 4. The oscillation section 3 and the control section 5 are connected through a bus, and the receiving section 4 and the control section 5 are connected through a bus.

The oscillation section 3 has a frequency controller (PLL) 31, an oscillator (VCO) 32, and a frequency counter 33. In the frequency counter 33, a frequency specified by the control section 5 is set. The frequency controller 31 controls the driving frequency of the oscillator 32, according to the set content. Note that the number of times of continuous occurrence of driving frequency (the wave number of a burst wave) is specified by the control section 5. The receiving section 4 has an amplifier 41 with the peak hold function for amplifying received signals, and an A/D converter 42 for sampling time-series received signals and outputting them to the control section 5.

The control section 5 has an MPU 51, a ROM 52, a RAM 53, a calculating section 54, a counter 55, a received data memory 56, a display section 57, an operating section 58, etc. The MPU 51 controls other hardware devices in the oscillation section 3, receiving section 4 and control section 5, and executes various software functions, according to computer programs stored in the ROM 52.

The ROM 52 stores in advance various software programs necessary for operating the touch panel device (control section 5). The RAM 53 stores temporary data produced during the execution of software. The calculating section 54 performs various calculation processes, including the process of calculating the contact position and contact width of an object. The counter 55 sets the wave number of a burst wave. The wave number set in the counter 55 can be varied according to received strength.

The received data memory 56 stores a time domain waveform obtained when no object is in contact with the panel, a waveform obtained by subtracting a predetermined slice value (threshold value) from the time domain waveform, the slice value (threshold value), etc. The time domain waveform obtained when no object is in contact with the panel is periodically updated. Besides, the slice value (threshold value) is also variable. The display section 57 displays the operation state of the touch panel device, and the contact position and contact width of the object detected. The operating section 58 receives an operational input entered by a user.

Figure 4:
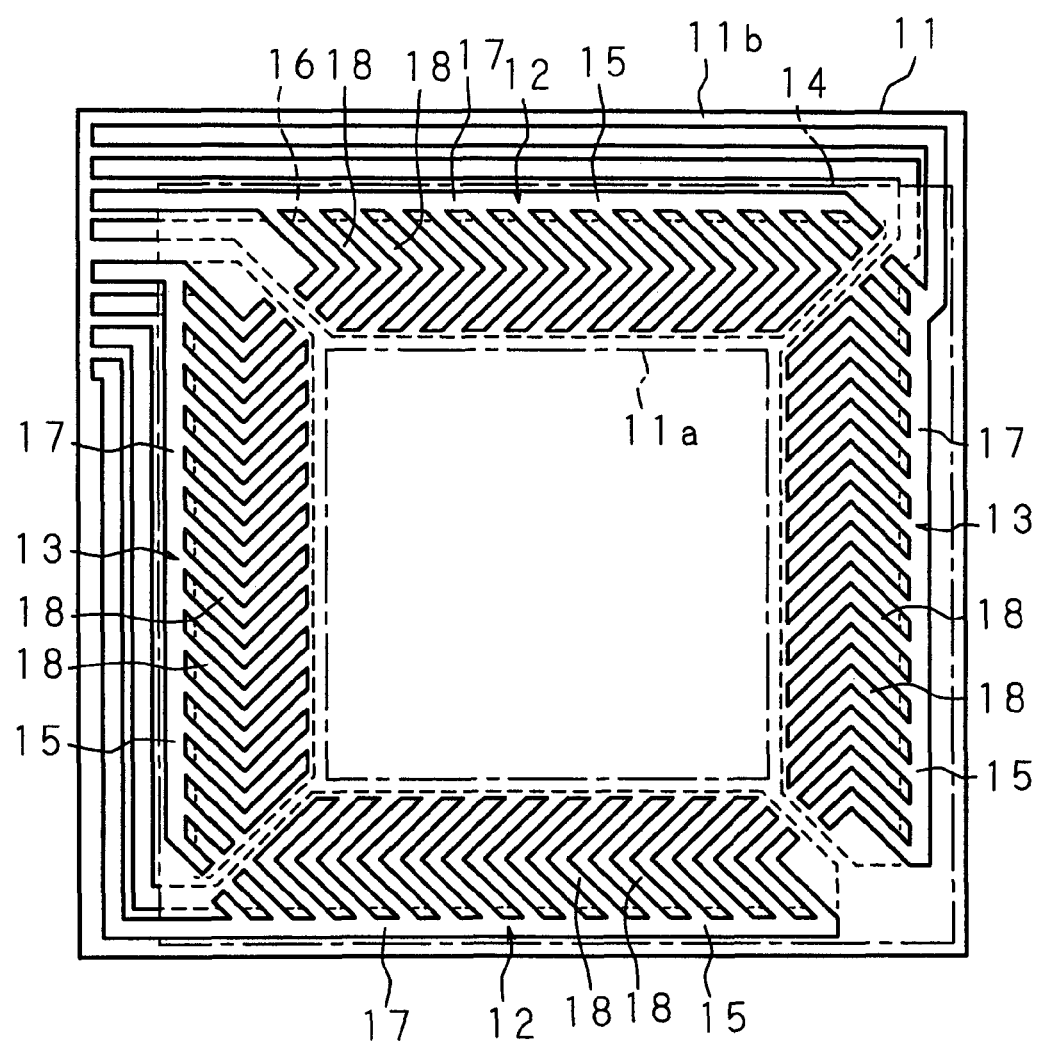
FIG. 4 is an illustration showing the configuration of a touch panel main body.

FIG. 4 is an illustration showing the configuration of the touch panel main body 1. In FIG. 4, the numeral 11 represents a rectangular non-piezoelectric substrate made, for example, of a glass material and capable of propagating surface acoustic waves, and a center portion enclosed by the alternate long and short dashed line is a detection region 11a capable of detecting the contact position. In a frame region 11b outside the detection region 11a, which is a peripheral section of the non-piezoelectric substrate 11, excitation elements 12 for simultaneously exciting surface acoustic waves in two directions are placed on the upper side and the lower side of the frame region 11b, and receiving elements 13 for simultaneously receiving surface acoustic waves from two directions are placed on the left side and the right side thereof.

These excitation elements 12 and receiving elements 13 have the same configuration, and each of the excitation elements 12 and receiving elements 13 is constructed by forming a comb-like electrode 15 on one surface of a piezoelectric body 14 in the form of a thin film made of AlN or ZnO, for example, and forming a plate electrode (solid electrode) 16 on the other surface thereof. As shown in FIG. 4, the comb-like electrode 15 on the front side comprises a line of bus electrode 17 and a plurality of electrode fingers 18 which are extended from the bus electrode 17 and bent into V shape in the middle. The comb-like electrode 15 and the plate electrode 16 of each excitation element 12 are connected to the oscillation section 3 of the touch panel drive device 2, and the comb-like electrode 15 and plate electrode 16 of each receiving element 13 are connected to the receiving section 4 of the touch panel drive device 2. Note that, in FIG. 4, the plate electrodes 16 are indicated by the broken lines, and the installation range of the piezoelectric body 14 is indicated by the alternate long and short dashed line.

In such a configuration, by applying a periodical signal between the comb-like electrode 15 and the plate electrode 16, surface acoustic waves are simultaneously excited in two directions by the excitation elements 12, and the excited surface acoustic waves are propagated in two diagonal directions of the non-piezoelectric substrate 11 and received by the receiving elements 13. More specifically, the surface acoustic waves from the upper-side excitation element 12 are propagated in a lower left oblique direction and a lower right oblique direction and then received by the left-side and right-side receiving elements 13, while the surface acoustic waves from the lower-side excitation element 12 are propagated in an upper left oblique direction and an upper right oblique direction and then received by the left-side and right-side receiving elements 13. Here, when an object such as a finger or a pen is in contact with the propagation path of a surface acoustic wave on the non-piezoelectric substrate 11, the surface acoustic wave attenuates. Therefore, by detecting the presence or absence of attenuation in the level of the received signals by the two receiving elements 13, it is possible to detect the presence or absence of contact of the object and the contact position.

In the present invention, according to the strength of the obtained time domain waveform, the wave number of the burst wave applied to the excitation element 12 is controlled so as to obtain a maximum gain of the time domain waveform. Besides, when detecting the contact position of the object, an updatable threshold value is used instead of always using a determined fixed threshold value.

Figure 5:
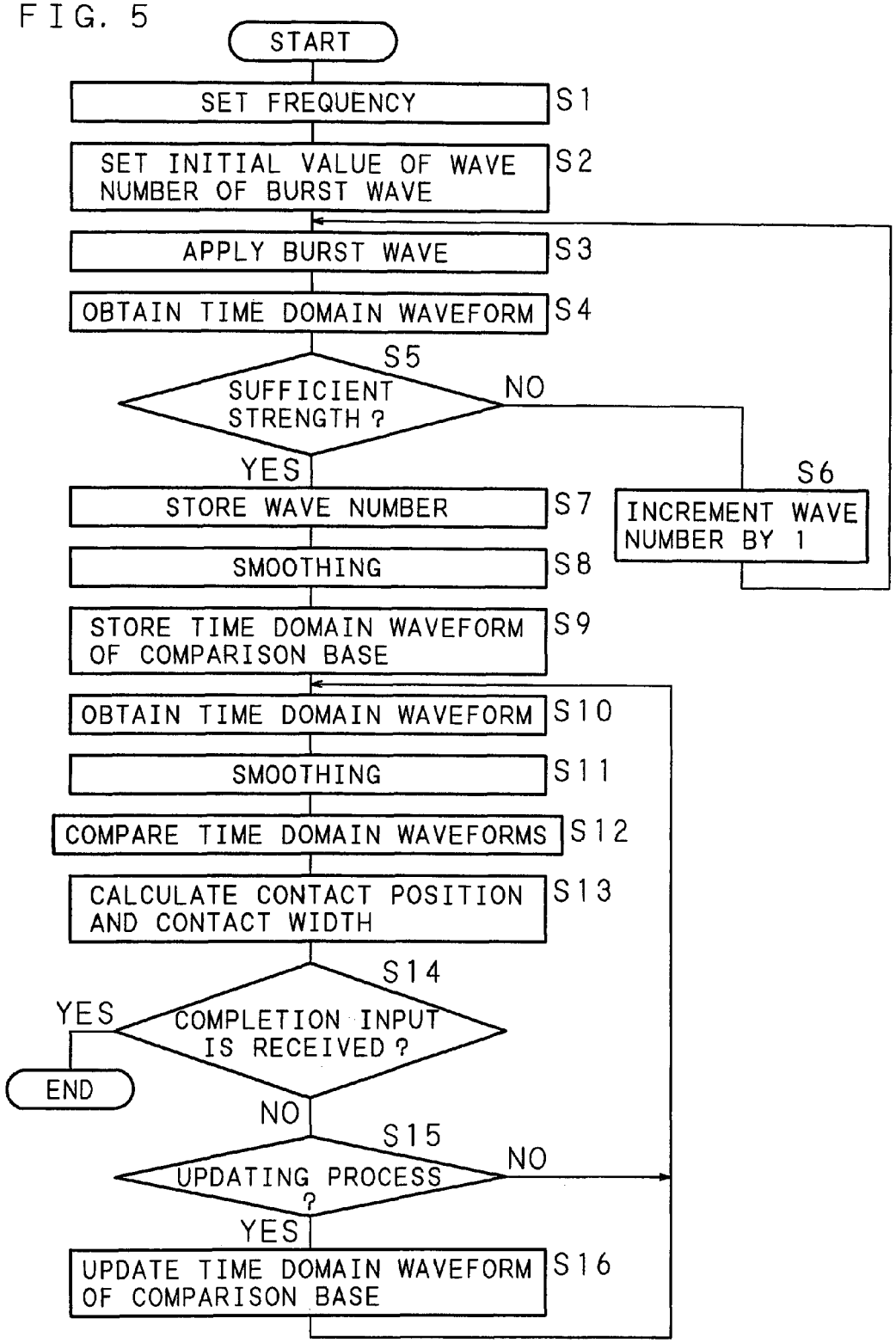
FIG. 5 is a flow chart showing the operating procedure of the touch panel device of the present invention.

Next, the operation of the touch panel device having such a configuration will be explained. FIG. 5 is a flowchart showing the operating procedure.

First, a frequency $f_0$ of the surface acoustic wave is set (step S1). More specifically, the set frequency $f_0$ is sent to the frequency counter 33, and a parameter for oscillating the oscillator 32 at the frequency $f_0$ is transmitted to the frequency controller 31. Next, an initial value n of the wave number of the burst wave is set in the counter 55 (step S2).

By using a pulse signal from the control section 5 as a trigger, the oscillation section 3 applies the burst wave only n times at the frequency $f_0$ (step S3). As a result, the surface acoustic waves excited by the excitation elements 12 propagate on the non-piezoelectric substrate 11 in diagonal directions and are received by the receiving elements 13, and the received signal waveform becomes a time domain waveform (step S4). The strength of the obtained time domain waveform is found, and it is judged whether or not the found strength is larger than a predetermined value (step S5).

If the found strength is smaller than the predetermined value (S5: NO), i.e., if sufficient received strength is not obtained, the wave number of the burst wave in the counter 55 is incremented only by 1 (step S6), and the operation of S3 to S5 is repeated. The relationship between the increase in the wave number of the burst wave and the received strength will be described in detail later.

If the found strength becomes larger than the predetermined value (S5: YES), i.e., if sufficient received strength is obtained, the wave number of the burst wave at this time is stored (step S7), the time domain waveform obtained at this time is smoothed (step S8), and then the smoothed time domain waveform and a time domain waveform obtained by subtracting a predetermined slice value (threshold value) from the smoothed time domain waveform are stored temporarily as the time domain waveforms of the comparison base in the received data memory 56 (step S9). The smoothed time domain waveform will be hereinafter referred to as the reference time domain waveform, and the time domain waveform obtained by subtracting the slice value from the reference time domain waveform will be hereinafter referred to as the slice time domain waveform. This slice time domain waveform is a time domain waveform to be compared when detecting the contact of an object. The smoothing process in S8 and the relationship among the reference time domain waveform, the slice time domain waveform and the slice value (threshold value) will be described in detail later.

After completing the above-described preparation steps, the calculation process for the contact position and contact width of the object is executed. In the condition in which the object is in contact with the touch panel device, the oscillation section 3 applies the burst wave only n times, which is stored in the counter 55, at the frequency $f_0$ to excite the excitation elements 12, the excited surface acoustic waves are propagated in the diagonal directions of the non-piezoelectric substrate 11 and received by the receiving elements 13, and the time domain waveform is obtained (step S10). The same smoothing process as in S8 is performed on the obtained time domain waveform (step S11). The time domain waveform as a comparison object obtained when the object is in contact with the touch panel device will be hereinafter referred to as the actual time domain waveform.

The obtained actual time domain waveform is compared with the slice time domain waveform stored in the received data memory 56 (step S12). Then, based on the comparison result, the contact position and the contact width of the object are calculated (step S13). The process of comparing these two time domain waveforms and the calculation process for the contact position and contact width of the object will be described in detail later. Next, it is judged whether or not an operational input to complete the detection process has been received (step S14), and, if it has been received (S14: YES), the entire operations are completed.

If the detection process continues to be performed (S14: NO), it is judged whether or not the time domain waveforms as the comparison base (reference time domain waveform and slice time domain waveform) are to be updated (step S15). If they are not to be updated (S15: NO), the operation of S10 to S14 is repeated to perform the next detection. If the time domain waveforms as the comparison base are to be updated (S15: YES), the updating process is executed (step S16), and then the operation of S10 to S14 is repeated. Thus, even in the actual detection process, it is possible to update the time domain waveforms as the comparison base. Since this updating process requires only 0.1 second or so, the updating process can be performed easily by choosing a timing in which the object is not in contact with the panel. A concrete technique of the updating process will be described in detail later.

The following description will explain the relationship between an increase in the wave number of the burst wave and the received strength in S2 to S6 of the flowchart in FIG. 5.

Figure 6:
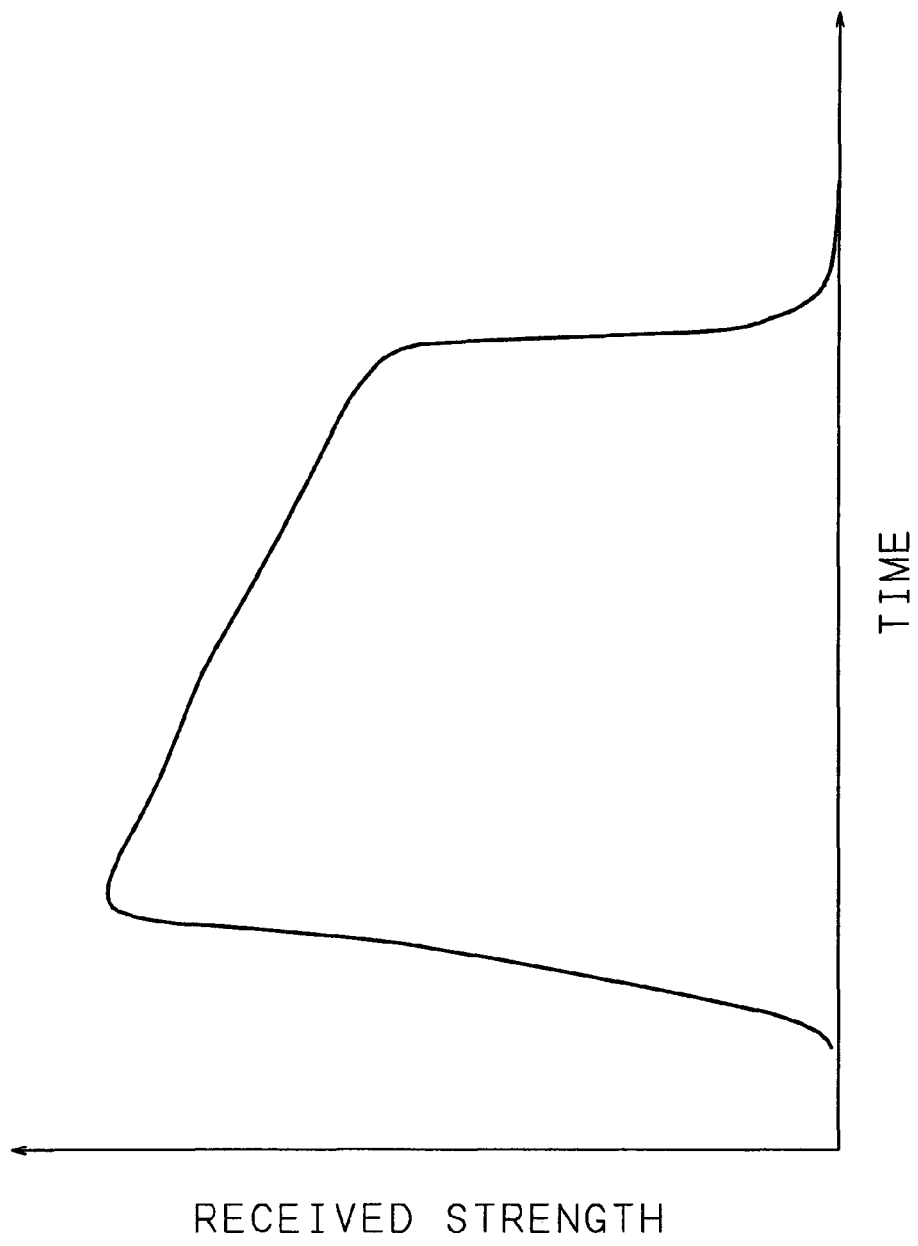
FIG. 6 is an illustration showing one example of a time domain waveform.

FIG. 6 is an illustration showing one example of the time domain waveform. Since the surface acoustic wave propagating on the non-piezoelectric substrate 11 attenuates according to the propagation distance as shown in FIG. 6, the received strength is high at near distances where the propagation distance is short (at early times), and the received strength decreases gradually with an increase in the propagation distance. In other words, when the surface acoustic wave is received at an early time, the strength of the surface acoustic wave is high, and the strength decreases at later reception time.

Figure 7:
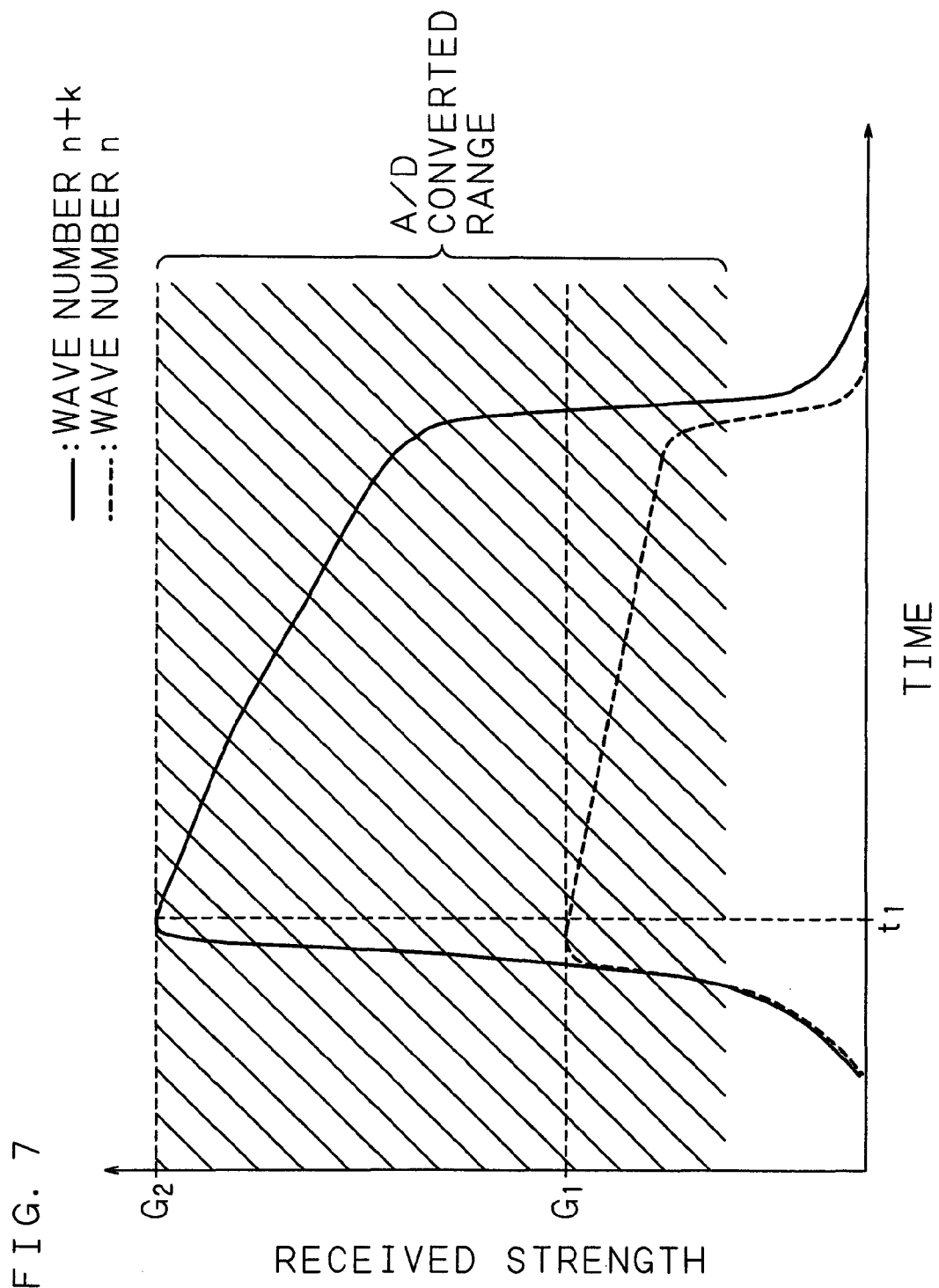
FIG. 7 is an illustration showing a difference in the time domain waveform when the wave number of a burst wave is varied.

FIG. 7 is an illustration showing the difference in the time domain waveform when the wave number of the burst wave is varied. In FIG. 7, the broken line indicates a time domain waveform when the wave number of the burst wave is set to n, and the solid line indicates a time domain waveform when the wave number of the burst wave is set to (n+k). Further, the portion shown by hatching in FIG. 7 indicates a range in which the time domain waveform can be captured by the A/D converter 42 of the receiving section 4.

The strength at time $t_1$ of the time domain waveform obtained by applying the burst wave n times is found, and it is judged whether or not the found strength is sufficient (S5 in FIG. 5). For example, in the case where the result obtained by the A/D conversion at 10 MHz and 8 bits is captured in the memory in the control section 5 from an address 0 and the strength is judged based on the received strength after $t_1=10$ µs from the start of receiving, the strength is judged based on the received strength at 10 µs×10 KHz=100, i.e., at the 100th byte from the top.

In the case where the strength of the time domain waveform is A/D converted at 8 bits in the range of 0 to 255, when the strength is closer to 255, the change in the time domain waveform can be represented by a larger number of bits, thereby enabling more accurate detection of contact of the object. Moreover, as the received strength increases, the shape of the time domain waveform is stabilized by an improvement of S/N, thereby reducing erroneous detection of contact. For example, if strength $G_1$ when the wave number of the burst wave is n is 100, only about 39% of receivable strength 255 is received.

Therefore, the wave number of the burst wave is increased by setting n n+1 (S6 in FIG. 5), and the same process is performed. When an ideal received strength of the time domain waveform is set at 95% of receivable received strength, the same process (S3 to S6 in FIG. 5) is repeated until received strength $G_2$ at the wave number (n+k) of the burst wave exceeds 242. Then, the wave number (n+k) of this case is stored in the counter 55 (S7 in FIG. 5).

Figure 8:
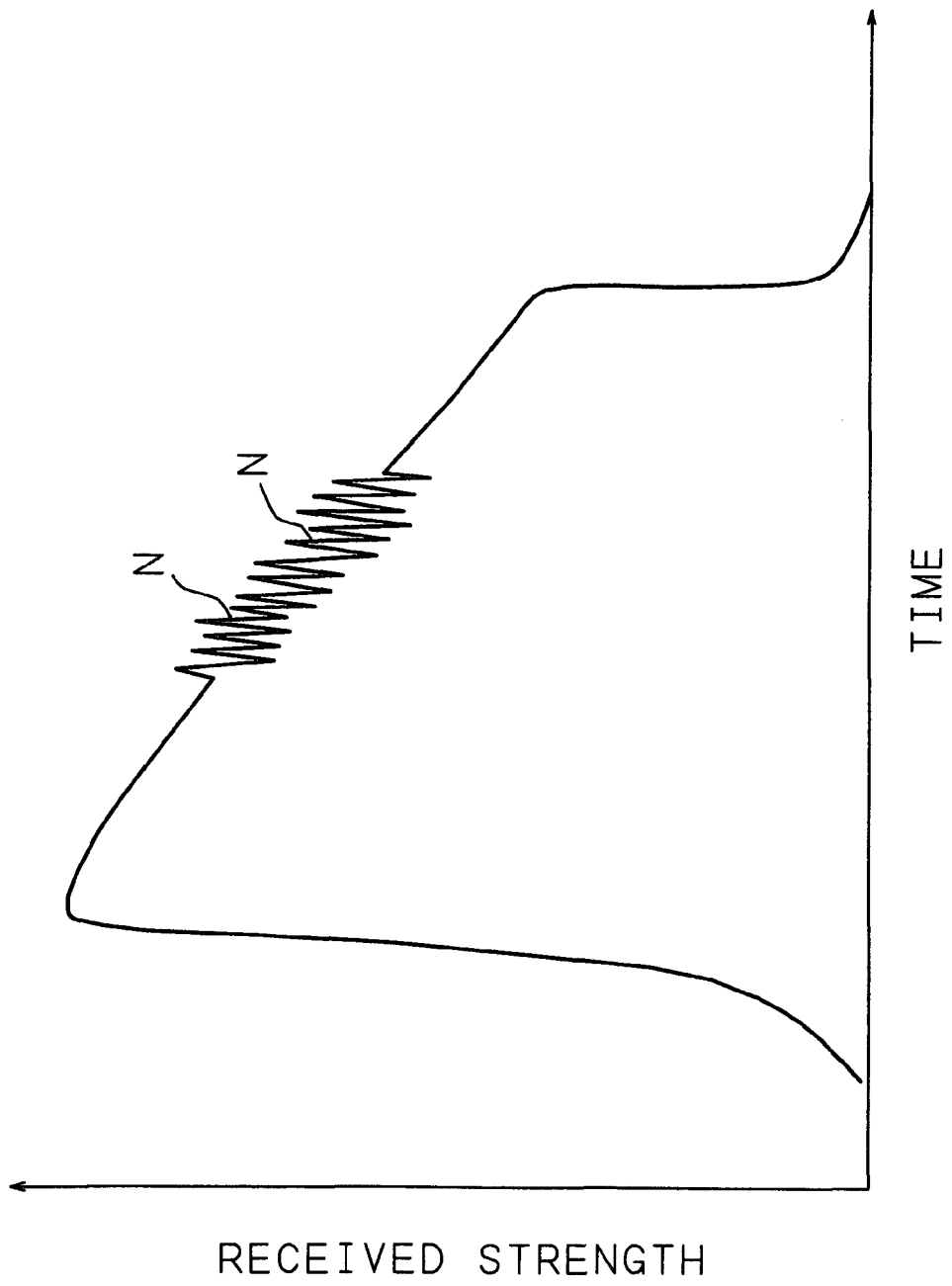
FIG. 8 is an illustration showing a time domain waveform including noise.

Next, the smoothing process of S8 of the flowchart in FIG. 5 will be explained. FIG. 8 is an illustration showing the time domain waveform including noise N. In the smoothing process, such noise N is eliminated by a moving-average method, for example. For instance, in the case where a moving average of 5 points is used, when sampling data (digital data) of the time domain waveform are captured in the order $V_{k-2}$, $V_{k-1}$, $V_k$, $V_{k+1}$, and $V_{k+2}$ and the kth data is to be obtained, the data itself and the preceding and succeeding data are multiplied by a coefficient as a weight. More specifically, data $V_k'$ after smoothed is calculated as shown by (1) below.

$$V_k'=(-3V_{k-2}+12V_{k-1}+17V_k+12V_{k+1}-3V_{k+2})/35 \qquad (1)$$

Figure 9:
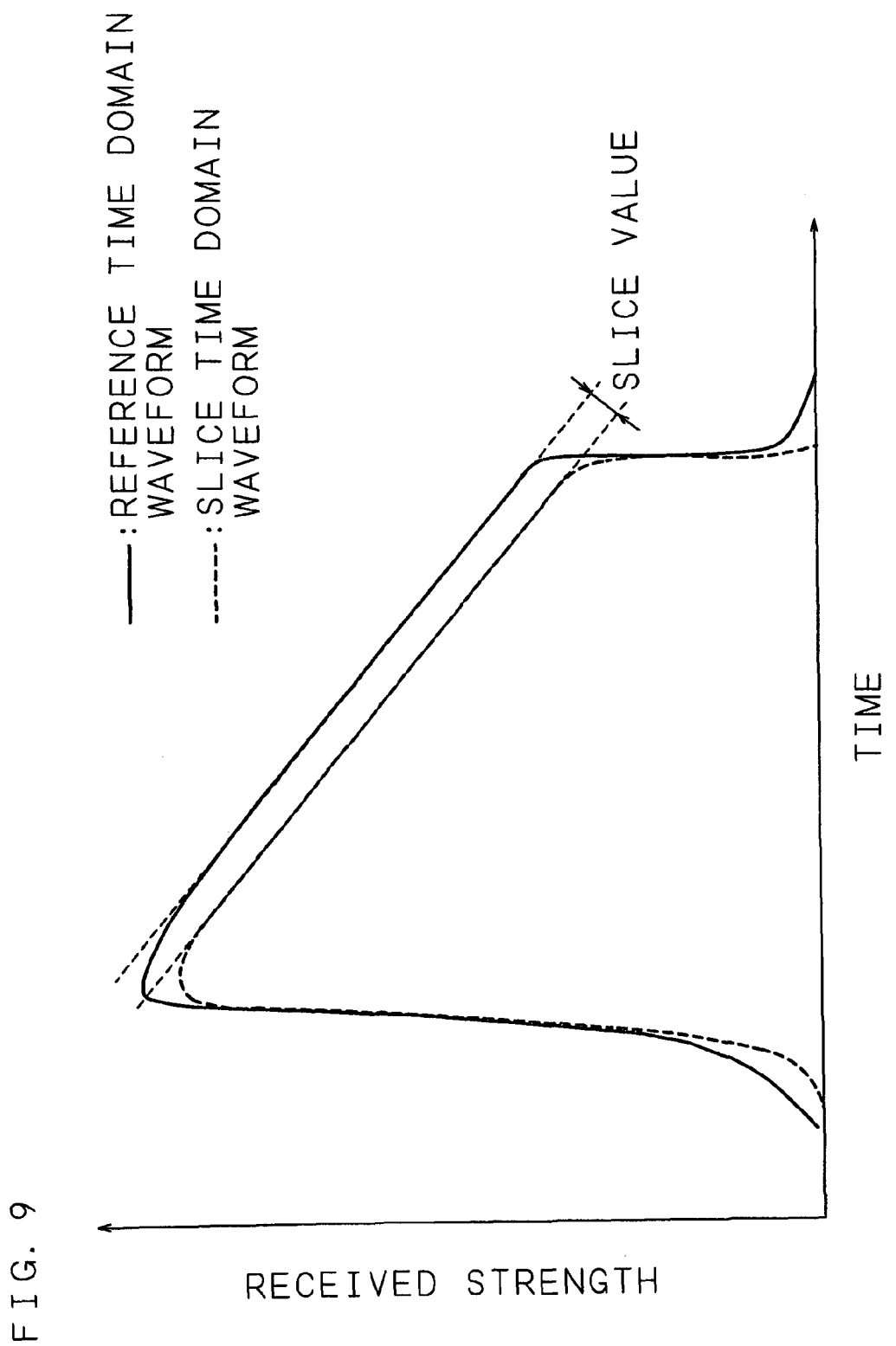
FIG. 9 is an illustration showing the time domain waveforms (reference time domain waveform and slice time domain waveform) as the comparison base.

The reference time domain waveform obtained by eliminating noise by such a smoothing process is stored in the received data memory 56 (S9 in FIG. 5). Moreover, the slice time domain waveform obtained by subtracting a predetermined slice value from the reference time domain waveform is also stored in the received data memory 56 (S9 in FIG. 5). FIG. 9 is an illustration showing such time domain waveforms as the comparison base. In FIG. 9, the solid line represents the reference time domain waveform, and the broken line represents the slice time domain waveform obtained by subtracting the slice value from the reference time domain waveform.

Next, the following description will explain the calculation process for the contact position and contact width of the object, in S10 to S13 of the flowchart in FIG. 5.

(First Calculation Process)

Figure 10:
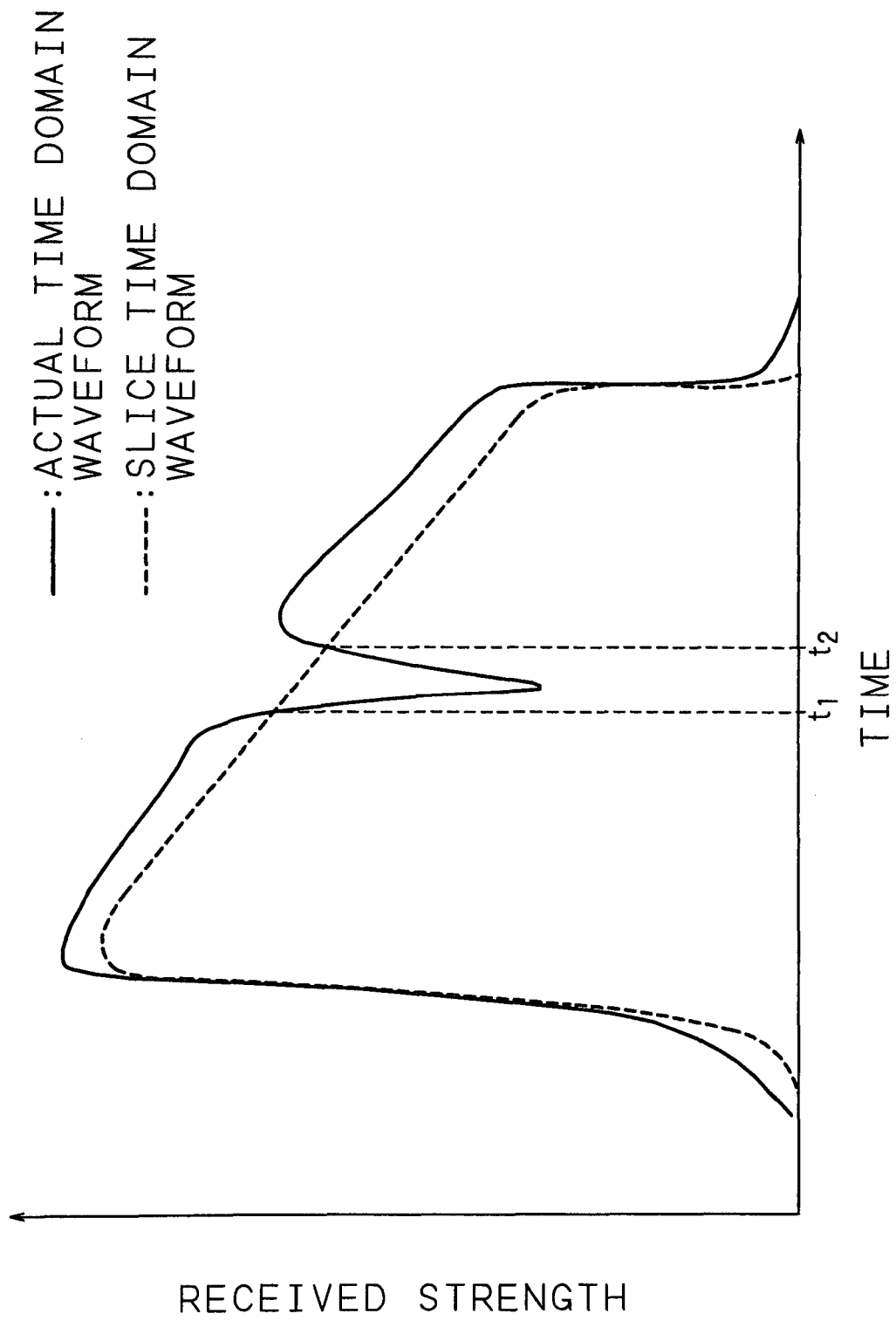
FIG. 10 is an illustration showing the principle of obtaining the attenuation start position and the attenuation end position.

The following explains the first technique for calculating the contact position and contact width of the object from the attenuation start position and attenuation end position of surface acoustic waves and the wave number of the burst wave. FIG. 10 is an illustration showing the principle of obtaining the attenuation start position and the attenuation end position, and FIG. 11 is an illustration showing the principle of calculating the contact position and the contact width.

In FIG. 10, the solid line represents the actual time domain waveform obtained in S10 and S11 in FIG. 5, and the broken line represents the stored slice time domain waveform. These two time domain waveforms are compared (S12 in FIG. 5), and the relationship in which the strength of the actual time domain waveform<the strength of the slice time domain waveform is seen when the surface acoustic waves attenuate because of the contact of the object. Thus, a time point at which this relationship first appears is the attenuation start point, and the data address $t_1$ of this point is obtained. Thereafter, a time point at which their relationship in the magnitude of strength is reversed is the attenuation end point, and the data address $t_2$ of this point is obtained.

Figure 11:
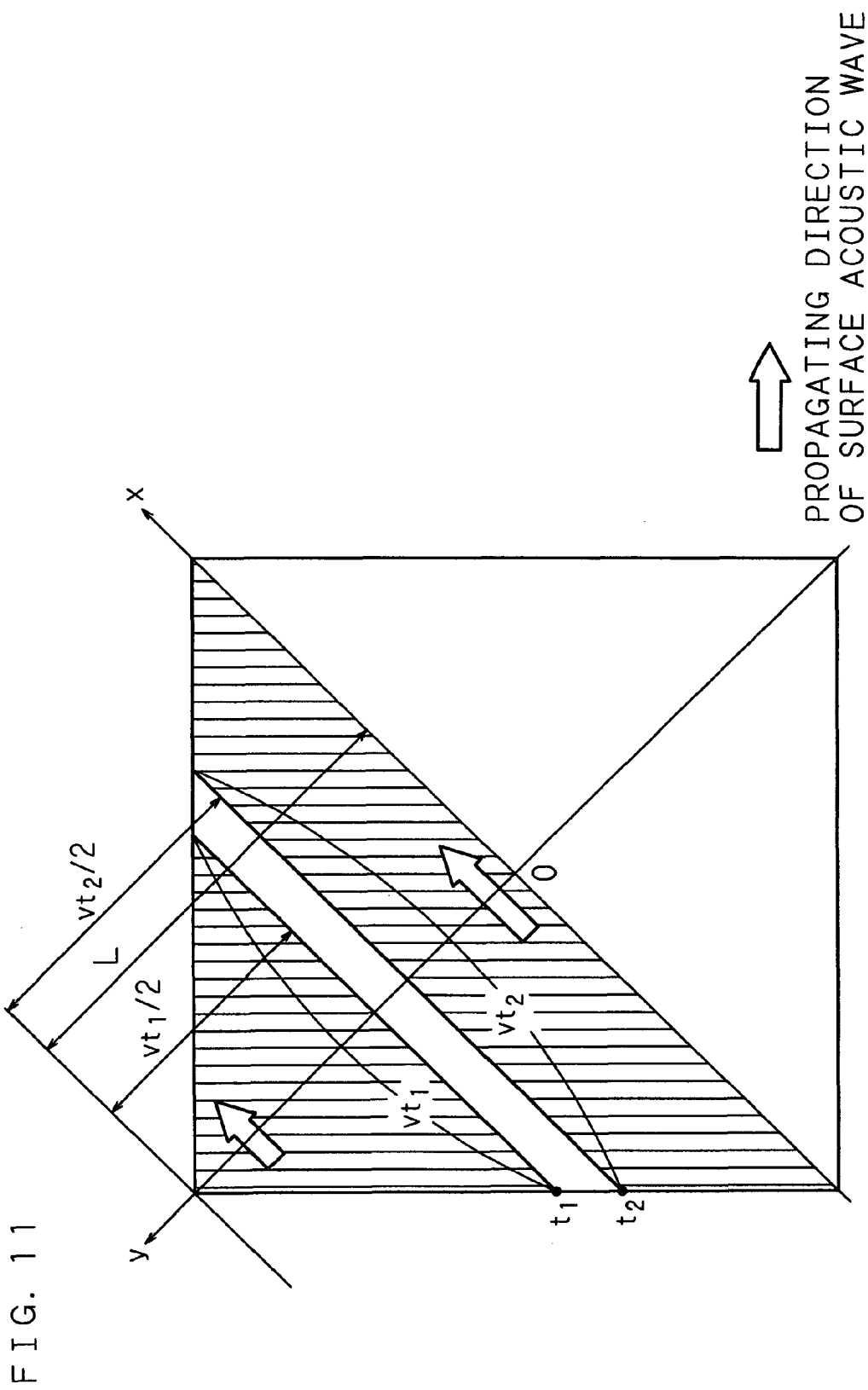
FIG. 11 is an illustration showing the principle of calculating the contact position and the contact width.

As shown in FIG. 11, an x-y coordinate system with its origin at the center of the square panel and the orthogonal x axis and y axis lying in diagonal directions is set, and a half the length of a diagonal line of the panel is denoted by L. Besides, suppose that attenuation (the void portion in FIG. 11) is seen in the range where y>0. When the propagation velocity of surface acoustic waves on the panel is denoted by v, the attenuation start position (contact start position) $y_i$ and the attenuation end position (contact end position) $y_2$ are respectively calculated using $t_1$ and $t_2$ as shown by equations (2) and (3) below.

$$y_i = L - vt_1/2 \qquad (2)$$

$$y_2 = L - vt_2/2 \qquad (3)$$

Further, the contact width w and the center of gravity g of the contact area are respectively calculated as shown by equations (4) and (5) below.

$$w = v(t_2 - t_1)/2 \quad (4)$$

$$g = L - v(t_1 - t_2)/4 \quad (5)$$

(Second Calculation Process)

Figure 12:
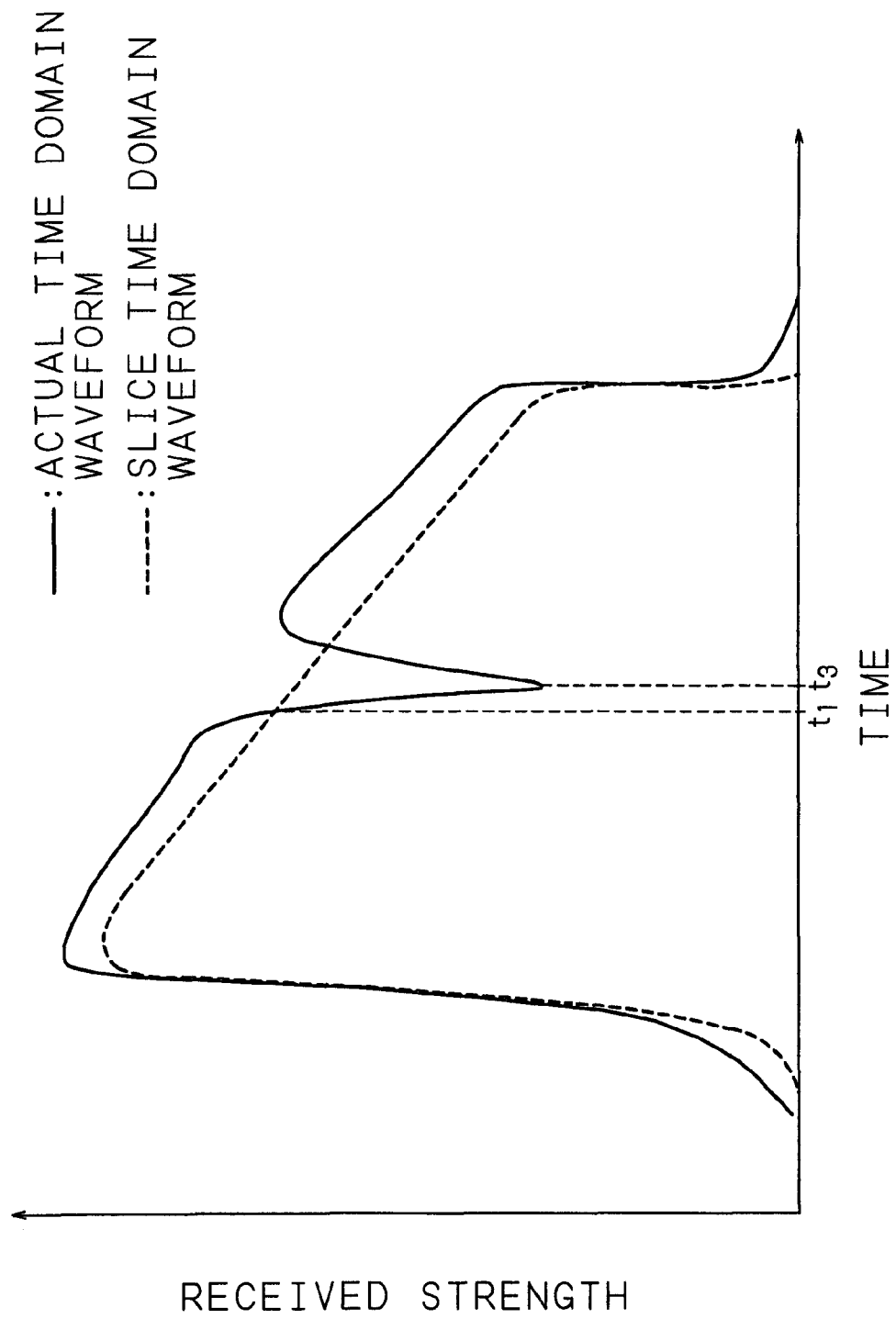
FIG. 12 is an illustration showing the principle of obtaining the attenuation start position and the maximum attenuation position.

The following explains the second technique for calculating the contact position and contact width of the object from the attenuation start position and maximum attenuation position of surface acoustic waves and the wave number of the burst wave. FIG. 12 is an illustration showing the principle of obtaining the attenuation start position and the maximum attenuation position, and FIG. 13 is an illustration showing the principle of calculating the contact position and the contact width.

In FIG. 12, the solid line represents the actual time domain waveform obtained in S10 and S11 in FIG. 5, and the broken line represents the stored slice time domain waveform. The two time domain waveforms are compared (S12 in FIG. 5), and a time point at which the relationship in which the strength of the actual time domain waveform<the strength of the slice time domain waveform first appears is determined to be the attenuation start point and the data address $t_1$ of this point is obtained in the same manner as in the first calculation process. Next, after the attenuation start point is determined, the attenuation that is the difference between the two time domain waveforms is successively calculated and stored in the RAM 53 in the control section 5. Then, a time point at which the difference (attenuation) is a maximum is determined to be the maximum attenuation point, and the data address $t_3$ of this point is obtained.

Figure 13:
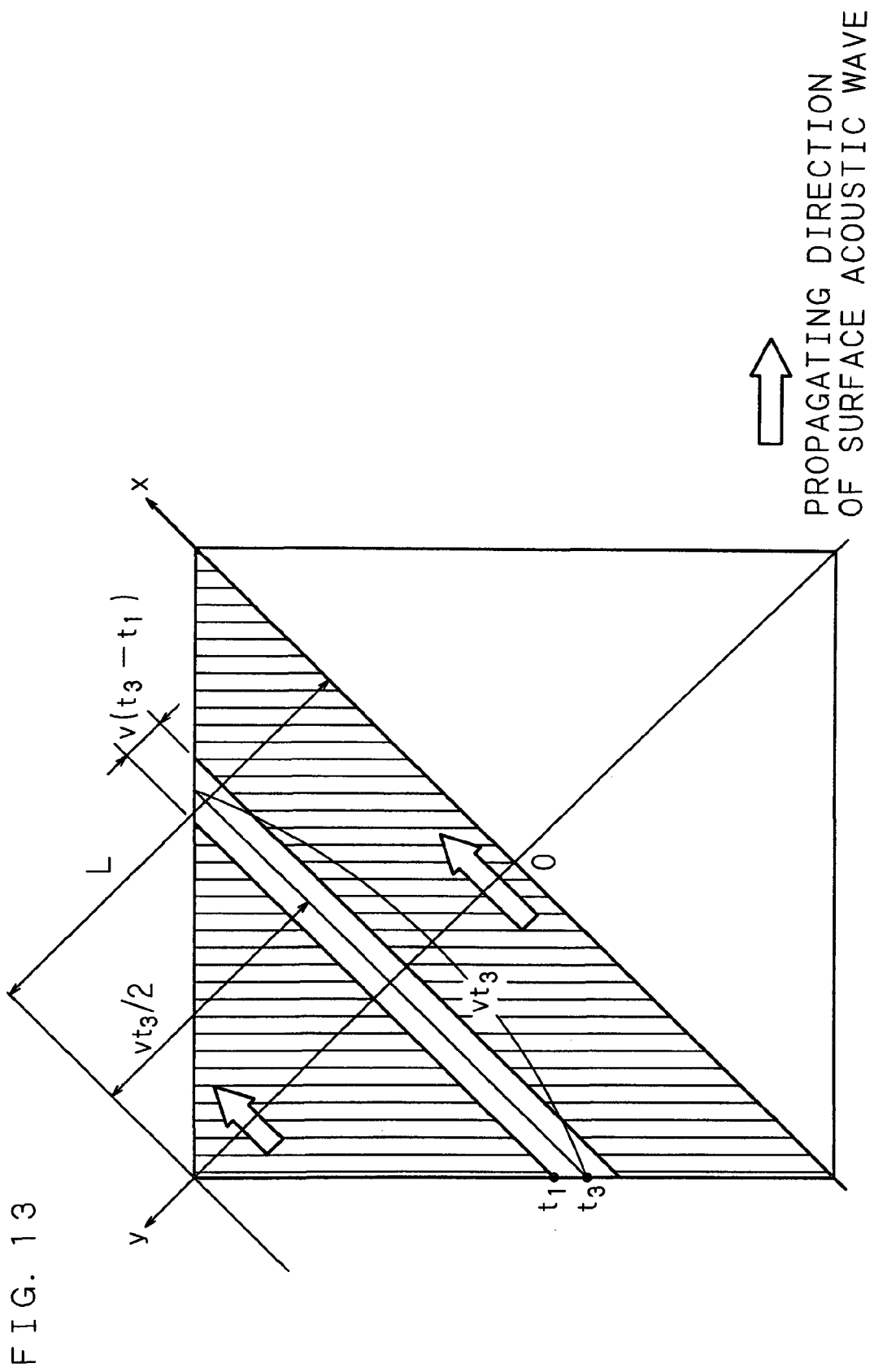
FIG. 13 is an illustration showing the principle of calculating the contact position and the contact width.

In FIG. 13, in the x-y coordinate system set in the same manner as in FIG. 11, suppose that attenuation (the void portion in FIG. 13) is seen in the range where y>0. The attenuation start position (the contact start position) $y_i$ and the maximum attenuation position (the center of gravity of contact position) $y_3$ are respectively calculated using $t_1$ and $t_3$ as shown by equations (6) and (7) below.

$$y_i = L - vt_1/2 \quad (6)$$

$$y_2 = L - vt_3/2 \quad (7)$$

Further, the contact width w is calculated as shown by equation (8) below.

$$w = v(t_3 - t_1) \quad (8)$$

Note that the above first and second calculation processes are explained for the case where there is attenuation in the range of y>0. However, even in the case where there is attenuation in the respective ranges of y<0, x>0, or x<0, it is of course possible to similarly calculate the attenuation start position, the attenuation end position, the maximum attenuation position, and the contact width. Further, based on these calculated values in the x direction and the y direction, the contact position and the contact width of the object are detected.

Figure 14:
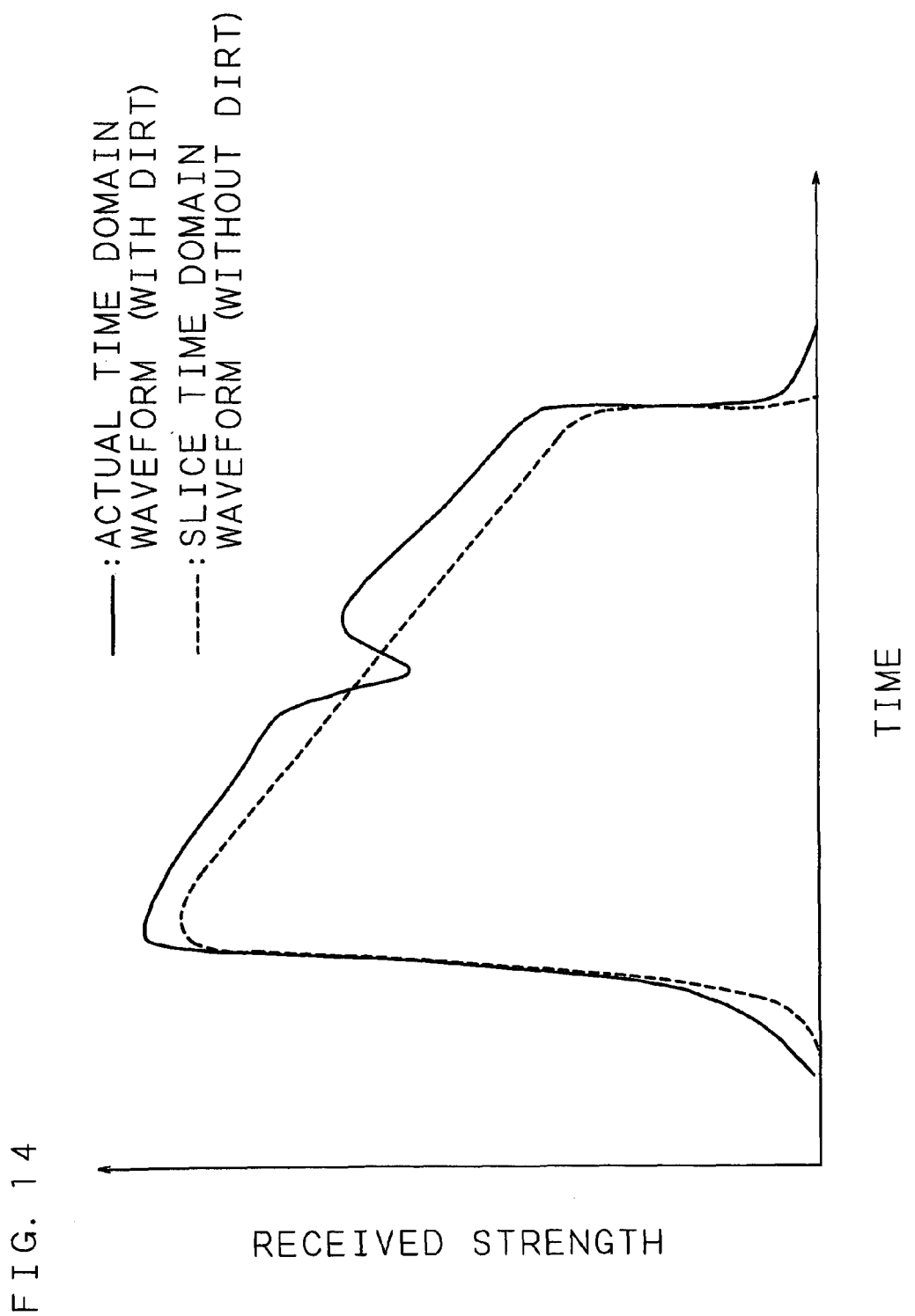
FIG. 14 is an illustration showing the time domain waveforms when dirt is adhering to the panel.

Next, the following explains an update process for the time domain waveforms as the comparison base in S15 of the flowchart in FIG. 5. Attenuation similar to that seen when the object is in touch with the panel is sometimes seen constantly, including the time in which the object is not in contact with the panel, because of adhesion of dirt such as finger prints to the panel. FIG. 14 is an illustration showing the time domain waveforms when such dirt is adhering to the panel.

In FIG. 14, the solid line represents the actual time domain waveform obtained when dirt is adhering to the panel, and the broken line represents the slice time domain waveform obtained when no dirt is adhering to the panel. As shown in FIG. 14, even when no object is in contact with the panel, the received strength attenuates because of the dirt adhering to the panel. Hence, in such a case, when the time domain waveform (solid line) is compared with the slice time domain waveform (broken line), erroneous detection is made due to the dirt. In order to avoid such a circumstance, in the present invention, the time domain waveforms as the comparison base are updated newly based on the actual time domain waveform (solid line) influenced by the dirt (S15 in FIG. 5).

Such an update process is carried out by, for example, a technique described below. When the values of the reference time domain waveform as the comparison base are A[1], A[2], . . . , A[N] (N is the number of samplings) and the values of the actual time domain waveform are B[1], B[2], . . . , B[N], the value C[1] (1≦i≦N) of the reference time domain waveform after update is given by C[1]=(A[1]+B[1])/2, C[2]=(A[2]+B[2])/2, C[N]=(A[N]+B[N])/2. By subtracting a predetermined slice value from the new reference time domain waveform thus obtained, the slice time domain waveform after update is obtained.

Figure 15:
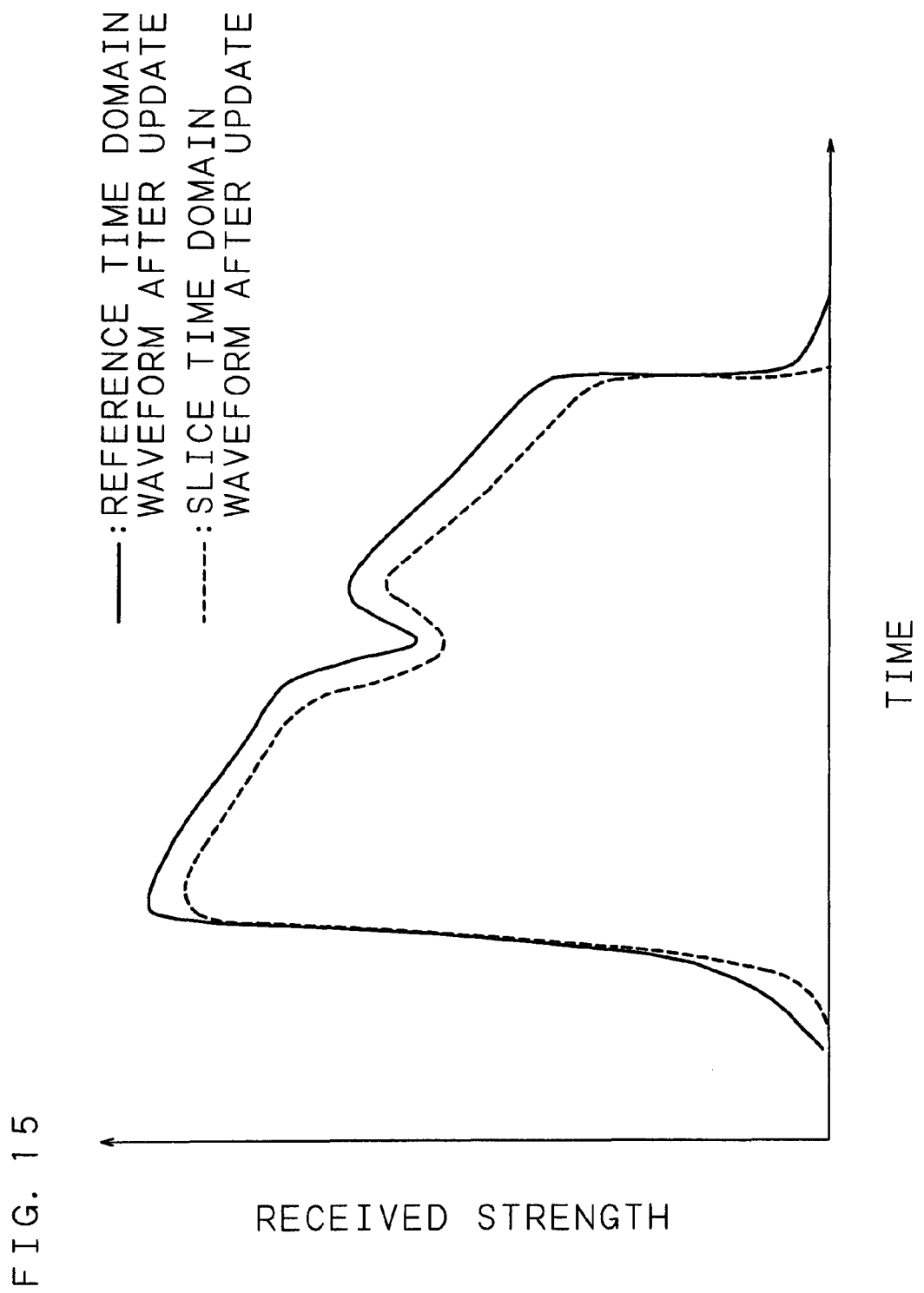
FIG. 15 is an illustration showing the reference time domain waveform and slice time domain waveform after update.

These reference time domain waveform and slice time domain waveform after update are stored in the received data memory 56. FIG. 15 is an illustration showing the reference time domain waveform and slice time domain waveform after update, and the solid line represents the reference time domain waveform after update and the broken line represents the slice time domain waveform after update. By using the slice time domain waveform as shown in FIG. 15 in the comparison process, it is possible to avoid erroneous detection when the panel is dirty.

Figure 16:
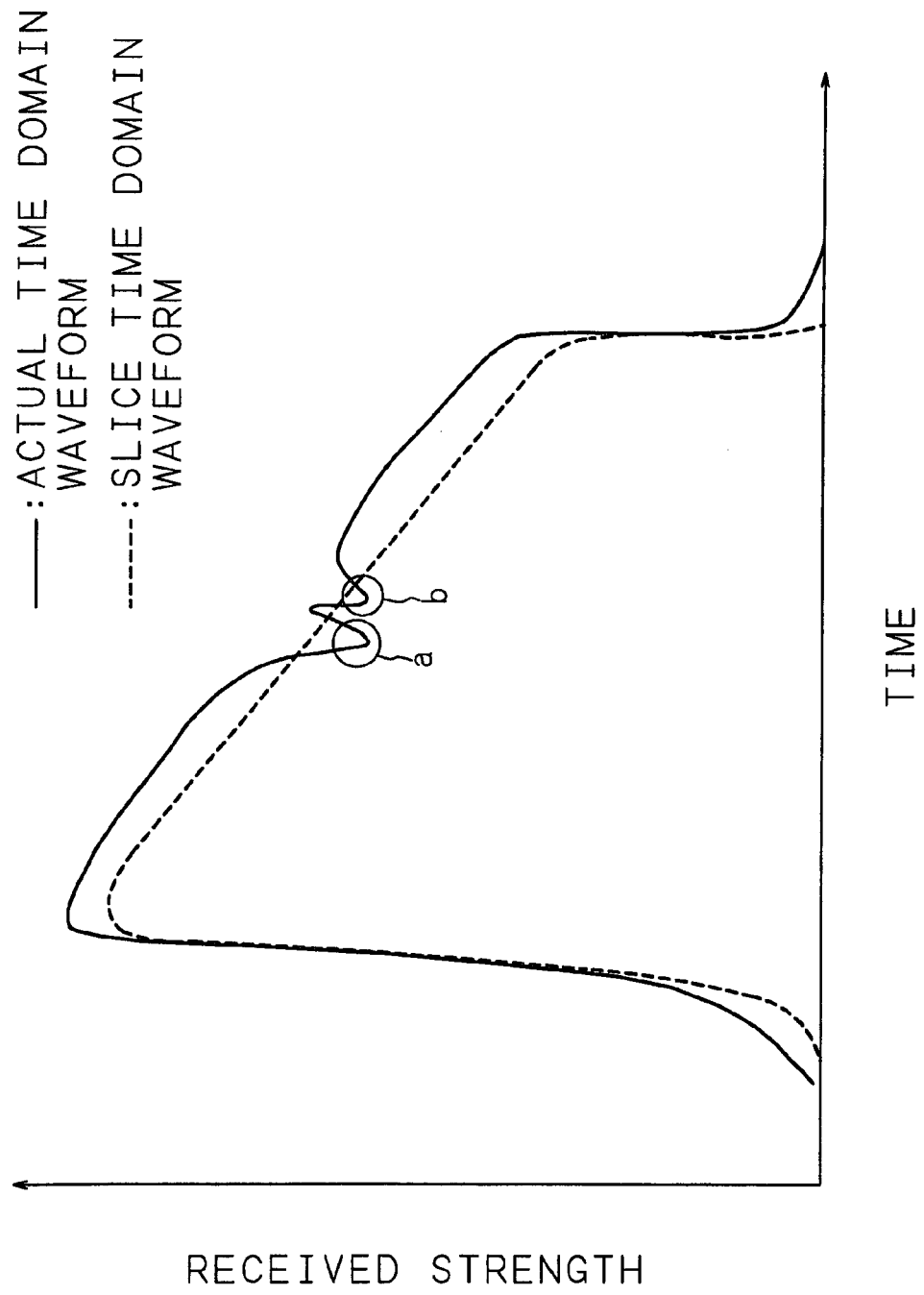
FIG. 16 is an illustration showing the relationship between the actual time domain waveform and the slice time domain waveform when contact positions are detected at two points.

Next, the following explains the process to be performed when a plurality of contact positions are detected. FIG. 16 is an illustration showing the relationship between the actual time domain waveform (solid line) and the slice time domain waveform (broken line) when contact positions are detected at two points. In such a case, the contact widths at the respective contact positions a and b are calculated, and the contact position with a larger contact width is validated, while the contact position with a smaller contact width is invalidated so as to detect a correct contact position.

Figure 17:
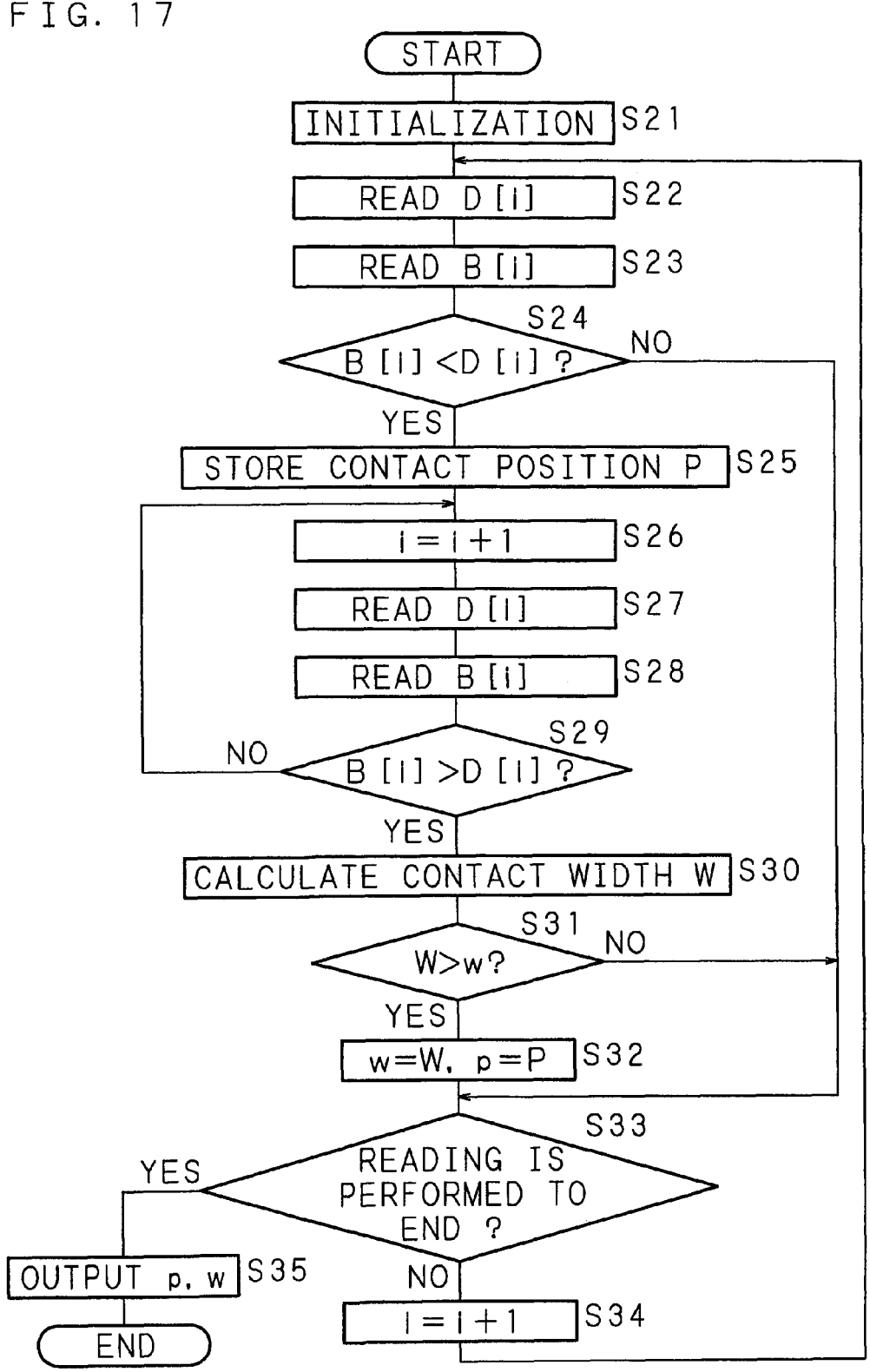
FIG. 17 is a flowchart showing the operating procedure for determining one contact position from a plurality of contact positions, based on the contact width.

FIG. 17 is a flowchart showing the operating procedure for determining one correct contact position from a plurality of contact positions, based on the contact width. In the following explanation, i is the count of the counter that shows the position of a sampling point, B[i] is the ith value of the actual time domain waveform, D[i] is the ith value of the slice time domain waveform, P is the calculated contact position, W is the calculated contact width, p is a variable of the contact position to be temporarily stored, and w is a variable of the contact width to be temporarily stored.

First, initialization (i=1, p=0, w=0) is performed (step S21). D[i] of the slice time domain waveform and B[i] of the actual time domain waveform are read (steps S22 and S23), and it is judged whether B[i]<D[i] (step S24). If B[i]<D[i] is not satisfied (S24: NO), since no object is in contact with the panel, the current read position i is confirmed and, if reading has not been performed to the end (step S33: NO), the count i of the counter is incremented by only 1 (step S34) and the operations is repeated from S22.

If B[i]<D[i] is satisfied (S24: YES), since an object is in contact with the panel, the current read position i is stored as the contact position P (step S25). Next, after incrementing the count i of the counter by only 1 (step S26), D[i] of the slice time domain waveform and B[i] of the actual time domain waveform are read (steps S27 and S28), and it is judged whether B[i]>D[i] (step S29). If B[i]>D[i] is not satisfied (S29: NO), since the object continues to be in contact with the panel, the operations is repeated from S26.

On the other hand, if B[i]>D[i] is satisfied (S29: YES), since the object is no longer in contact with the panel, the contact width W at this time is calculated (step S30). It is judged whether or not the calculated W is larger than w (step S31), and if W is larger than w (S31: YES), the calculated W is set as w and the contact position P at this time is set as p (step S32). If W is smaller than w (S31: NO), the values of w and p are not changed.

Then, the current read position i is confirmed, and it is judged whether or not reading has been performed to the end (S33). If reading has not been performed to the end (S33: NO), the count i of the counter is incremented by only 1 (S34), and the operation is repeated from S22. If reading has been performed to the end (S33: YES), the values set for p and w (contact position and contact width) are outputted (step S35).

Next, the following explains the process of correcting the received strength, according to the propagation distance of surface acoustic waves. As described above, as the propagation distance increases, the degree of attenuation increases, and therefore the time domain waveform attenuates (see FIG. 6). Hence, in the present invention, by taking into account the attenuation due to propagation, a decrease in the received strength is corrected, and consequently the time domain waveform is smoothed.

Figure 18:
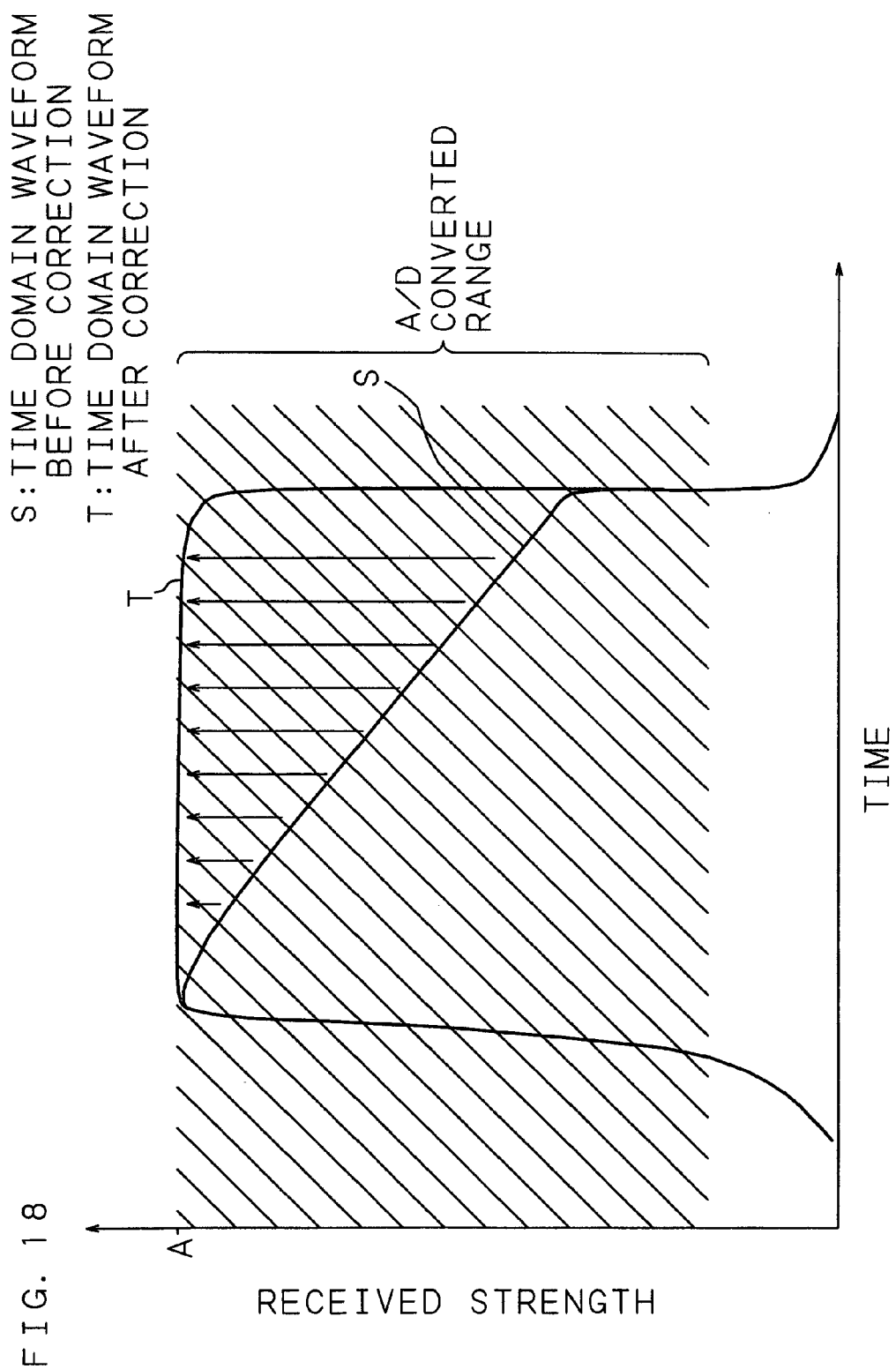
FIG. 18 is an illustration explaining the principle of the receiving signal correction process (smoothing process)

FIG. 18 is an illustration explaining the principle of such a correction process (smoothing process). In FIG. 18, a solid line S represents the time domain waveform before corrected (before smoothed), and a solid line T represents the time domain waveform after corrected (after smoothed).

Since the time domain waveform is converted into digital data by the A/D converter 42, the correction is performed by multiplying the respective digital data by a coefficient. When the panel size is 3 inches, the maximum value from the amplifier 41 is about twice larger than the minimum value. Specifically, when the time domain waveform is A/D converted at 8-bit, 256 resolution, if the maximum value is 200, the minimum value is 100. Here, if the sampling points are 100 points, received strength V(i) at the ith point is corrected as shown by equation (9) below. When the strength at the 100th point becomes a half of the strength at the 1st point due to attenuation, if the strength at the 1st point is denoted by A and the strength at the 100th point is calculated according to expression (9) below, then A is given as shown by equation (10) below, thereby correcting the attenuation caused by propagation.

$$V(i)/(1-0.005i) \qquad (9)$$

$$0.5A/(1-0.005\times 100)=A \qquad (10)$$

Figure 19:
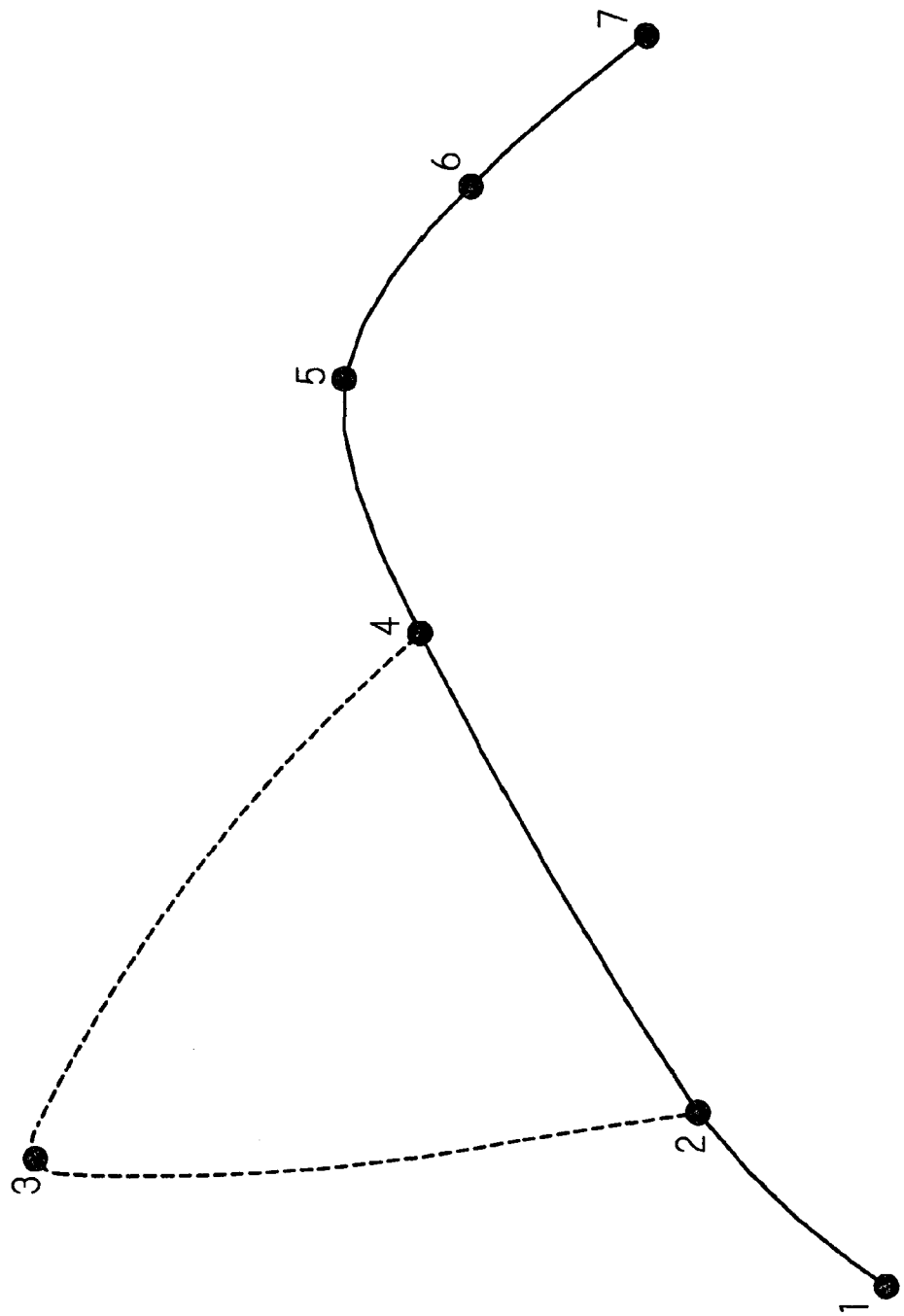
FIG. 19 is an illustration showing the principle of eliminating an abnormal contact position among a plurality of contact positions.

Next, the following explains the process of selecting an abnormal contact position among a plurality of finally detected contact positions and eliminating it. FIG. 19 is an illustration showing the principle of this process. The contact position is detected every fixed time interval. In addition, since the moving speed of the object in contact with the panel is limited, if the movement of the contact position is larger than a predetermined value, the detected contact position (contact position 3 in FIG. 19) is regarded as noise and invalidated.

For example, if the number of times of detecting the contact position is 200 times per second and the maximum moving speed of the object is 100 cm per second, then the maximum movement of the contact position is 0.5 cm. Therefore, when the movement is more than 0.5 cm (for example, when the distance between the contact positions 2 and 3 in FIG. 19 is 1 cm), the contact position 3 is regarded as noise and eliminated. Further, a curve passing through the contact positions 1, 2, 4, 5, 6 and 7 is regarded as the path of the object.

Figure 1:
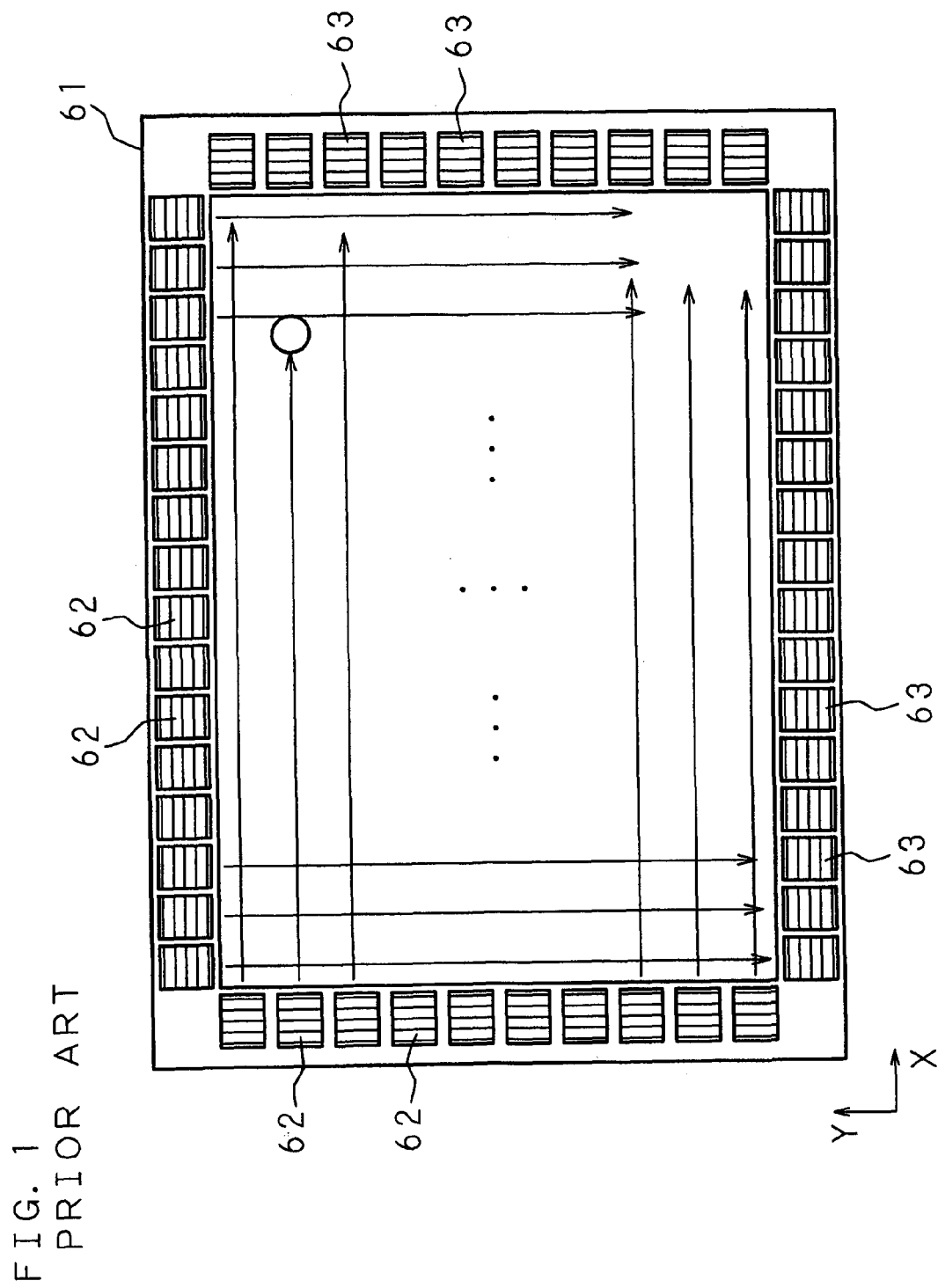
FIG. 1 is an illustration showing the configuration of a conventional touch panel device.
Figure 2:
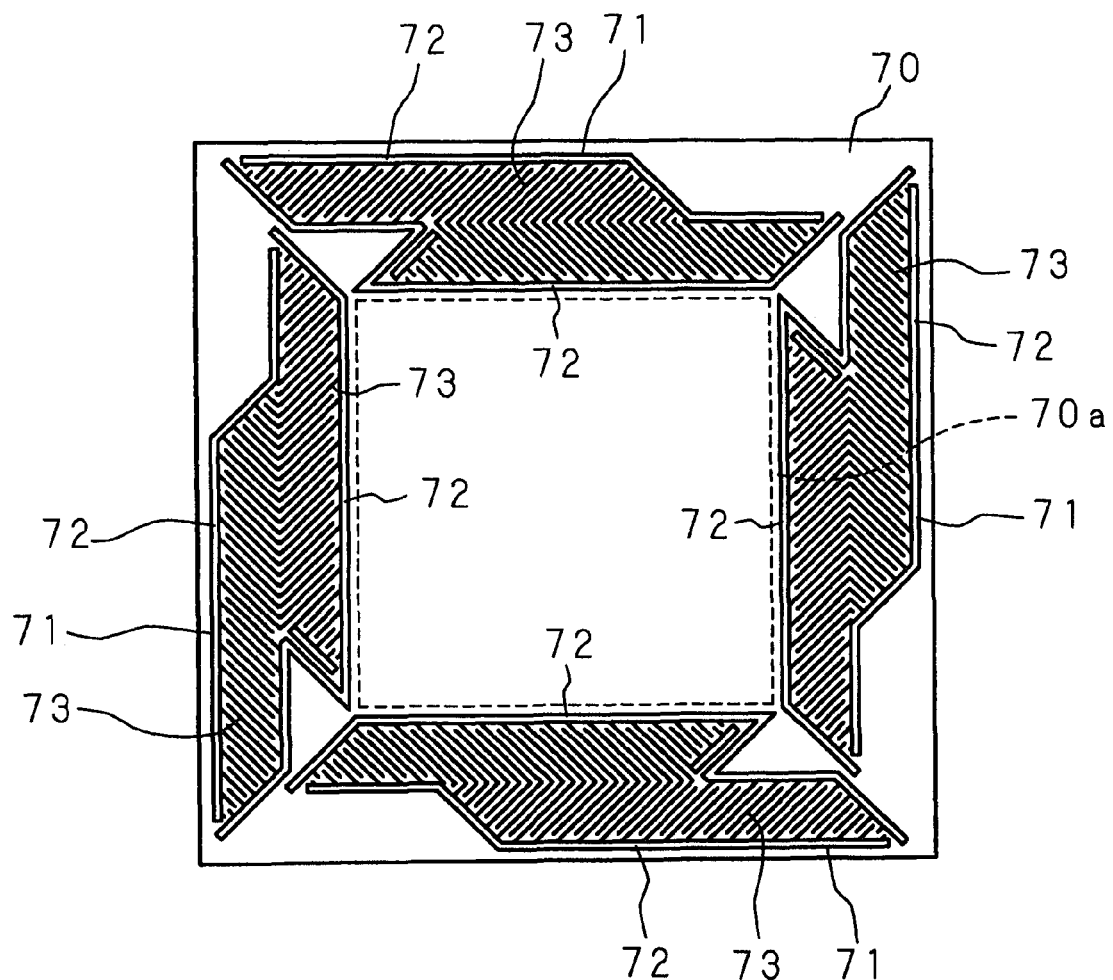
FIG. 2 is an illustration showing an example of the electrode structure of a conventional touch panel device.

Note that although the above-described embodiment illustrates a touch panel device having the structure in which surface acoustic waves are propagated in the diagonal directions of the square panel (see FIG. 4), it is of course possible to similarly apply the present invention to a touch panel device having the structure in which surface acoustic waves are propagated in the side directions of the square panel (see FIG. 2).

As described in detail above, in the present invention, since the wave number of the burst wave to be applied to exciting means is controlled based on the strength of the received surface acoustic waves, even when the strength of the time domain waveform changes because of finger prints, etc., a stable touch sensitivity can always be obtained. Moreover, even when the touch panel is dirty, the contact position of the object can be highly accurately detected without applying high pressure of the object (tool force).

Furthermore, in the present invention, since the obtained time domain waveform is smoothed, it is possible to eliminate the influence of noise, and improve the detection accuracy of the contact position.

Besides, in the present invention, since a contact position is detected based on the received results of surface acoustic waves which are received when no object is in contact with the panel and the received results of surface acoustic waves which are received when an object is in contact with the panel, even when the panel is dirty and the touch sensitivity is low, it is possible to correctly detect the contact position of the object without using a fixed threshold value which is determined during design or activation in a conventional art.

Additionally, in the present invention, since the received results of surface acoustic waves which are received when no object is in contact with the panel and are stored are periodically updated, it is possible to detect the contact position without being influenced by constant change in the time domain waveform caused by dirt on the panel.

Moreover, in the present invention, since the contact position and/or the contact width of the object are detected based on the attenuation start position and attenuation end position and the wave number of the burst wave, or based on the attenuation start position and maximum attenuation position and the wave number of the burst wave, it is possible to correct the deviation of the contact position due to the wave number of the burst wave, and improve the detection accuracy.

Furthermore, in the present invention, when a plurality of contact positions are detected, since the contact position with the largest contact width is selected, it is possible to identify the correct contact position.

Besides, in the present invention, since the strength of the time domain waveform is corrected according to the propagation distance, it is possible to achieve uniform detection sensitivity on the panel.

Further, in the present invention, when the distance between the contact positions detected every fixed time interval is longer than a predetermined value, since the contact position is invalidated, it is possible to eliminate an erroneously detected contact position.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A touch panel device having at least one pair of excitation section for exciting surface acoustic waves by application of a burst wave and receiving section for receiving surface acoustic waves at a storing period and a detecting period, which are arranged to face each other on a substrate capable of propagating surface acoustic waves, for propagating surface acoustic waves between said excitation section and said receiving section on said substrate and detecting presence or absence of an object in contact with said substrate, based on received results by said receiving section, said touch panel device comprising:
   a storing section for storing a surface acoustic wave received at said storing period by said receiving section as a comparison base surface acoustic wave;
   an obtaining section for obtaining a surface acoustic wave received at said detecting period by said receiving section as a comparison object surface acoustic wave; and
   a comparing section for performing a comparison of said comparison base surface acoustic wave and said comparison object surface acoustic wave, wherein
   said storing period and said detecting period are periodically repeated, respectively,
   when a result of the comparison indicates that said comparison object surface acoustic wave has been changed from said comparison base surface acoustic wave, said touch panel device detects that said of objects has been present, and
   said surface acoustic wave received at said storing period by said receiving section is not utilized as said comparison object surface acoustic wave.

2. The touch panel device of claim 1, further comprising an updating section for updating the received results stored in said storing section.

3. The touch panel device of claim 2, further comprising:
   a calculating section for calculating an attenuation start position and an attenuation end position of received surface acoustic waves, based on a comparison result obtained by said comparing section; and
   a detecting section for detecting a contact position and/or a contact width of the object, based on the attenuation start position and attenuation end position calculated by said calculating section and the wave number of the burst wave applied to said excitation section.

4. The touch panel device of claim 2, further comprising:
   a calculating section for calculating an attenuation start position and a maximum attenuation position of received surface acoustic waves, based on a comparison result obtained by said comparing section; and
   a detecting section for detecting a contact position and/or a contact width of the object, based on the attenuation start position and maximum attenuation position calculated by said calculating section and the wave number of the burst wave applied to said excitation section.

5. The touch panel device of claim 1, further comprising:
   a calculating section for calculating an attenuation start position and an attenuation end position of received surface acoustic waves, based on a comparison result obtained by said comparing section; and
   a detecting section for detecting a contact position and/or a contact width of the object, based on the attenuation start position and attenuation end position calculated by said calculating section and the wave number of the burst wave applied to said excitation section.

6. The touch panel device of claim 1, further comprising:
   a calculating section for calculating an attenuation start position and a maximum attenuation position of received surface acoustic waves, based on a comparison result obtained by said comparing section; and
   a detecting section for detecting a contact position and/or a contact width of the object, based on the attenuation start position and maximum attenuation position calculated by said calculating section and the wave number of the burst wave applied to said excitation section.

7. The touch panel device of claim 1 further comprising a correcting section for correcting strength of surface acoustic waves received by said receiving section, according to propagation distances of the surface acoustic waves.

* * * * *